United States Patent
Bolle et al.

(10) Patent No.: US 7,072,523 B2
(45) Date of Patent: Jul. 4, 2006

(54) SYSTEM AND METHOD FOR FINGERPRINT IMAGE ENHANCEMENT USING PARTITIONED LEAST-SQUARED FILTERS

(75) Inventors: Rudolf M. Bolle, Bedford Hills, NY (US); Sugata Ghosal, New Delhi (IN); Sarathchandra Pankanti, Mount Kisco, NY (US); Nalini Ratha, White Plains, NY (US); Raghavendra U. Udupa, New Delhi (IN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 754 days.

(21) Appl. No.: 09/943,896

(22) Filed: Aug. 31, 2001

(65) Prior Publication Data

US 2002/0146178 A1 Oct. 10, 2002

(51) Int. Cl.
*G06K 9/40* (2006.01)
(52) U.S. Cl. ...................... 382/254; 382/124
(58) Field of Classification Search ............... 382/124, 382/125, 190, 191, 195, 203, 254, 260, 261, 382/265
See application file for complete search history.

(56) References Cited

U.S. PATENT DOCUMENTS

| | | | | |
|---|---|---|---|---|
| 5,048,100 A | * | 9/1991 | Kuperstein | 382/157 |
| 5,572,597 A | * | 11/1996 | Chang et al. | 382/125 |
| 5,825,936 A | * | 10/1998 | Clarke et al. | 382/261 |
| 5,901,246 A | * | 5/1999 | Hoffberg et al. | 382/209 |
| 6,084,981 A | * | 7/2000 | Horiba et al. | 382/157 |
| 6,647,132 B1 | * | 11/2003 | Montillo et al. | 382/108 |

* cited by examiner

Primary Examiner—Yon J. Couso

(74) Attorney, Agent, or Firm—John L. Rogitz

(57) ABSTRACT

In an automatic fingerprint authentication or identification system, the fingerprint image acquisition is severely effected by the limitations of the acquisition process. The two modes of input, viz. scanning inked fingerprints from paper records or directly from a finger using live-scan fingerprint scanners suffer from the following noise sources in the input in addition to standard noise in the camera. Non-uniform ink application, uneven pressure while rolling on the paper or pressing on the scanner surface and external dirt like oil and climatic variations in the moisture content of skin are some of the main causes for the ridges and valleys not to be imaged clearly. This invention deals with a method of learning a set of partitioned least-sqaures filters that can be derived from a given set of images and ground truth pairs as an offline process. The learned filters are convolved with input fingerprint images to obtain the enhanced image.

24 Claims, 17 Drawing Sheets

SYSTEM AND METHOD FOR FINGERPRINT IMAGE ENHANCEMENT USING PARTITIONED LEAST-SQUARED FILTERS

FIELD OF THE INVENTION

The present invention relates to the area of fingerprint image processing and, in particular, to enhancement of the input fingerprint image for aiding in visual examination of various fingerprint features and computer processing of the input fingerprint for verification and identification of the subject.

BACKGROUND OF THE INVENTION

Reliable personal identification is critical in many applications in order to prevent identity fraud.

The losses due to identity fraud can be substantial in terms of money and confidentiality. Traditionally, Automatic Authentication Systems have been employed in applications such as criminal identification, access control systems, and large-scale social service or national identity registry applications. With the emergence of new applications in E-Commerce there is a renewed interest in fast and accurate personal identification. For example, in applications such as web-based retailing, autonomous vending, and automated banking, authentication of consumer identity is critical to prevent fraud. In many of the new applications, the amount of time taken for identification is an important issue along with accuracy since the applications are real-time. While many authentication schemes have been proposed and implemented, biometrics is emerging as the most foolproof method of automated personal identification. The relative permanence of physiological/behavioral characteristics, the fact that biometrics cannot be lost or misplaced, and uniqueness over a large population have been cited as the distinct advantages of biometrics over other authentication mechanisms. Traditionally, fingerprints have been the most widely used and trusted biometrics. The ease of acquisition of fingerprints, the availability of inexpensive fingerprint sensors and a long history of usage in personal identification make fingerprints the most acceptable form of authentication.

A fingerprint is characterized by smoothly flowing ridges and valleys. The patterns formed by the alternating ridges and valleys have been verified to be unique to each person over a large population and have been used for personal verification over the past few centuries, primarily by the forensic community. For automated fingerprint verification a compact representation of the rich topology of valleys and ridges is desirable. Most automated fingerprint verification systems extract features from the fingerprint images and use the feature sets for verification. The naturally occurring ridge anomalies called the minutiae capture the essential features needed for automated verification. There are two basic types of ridge anomalies—ridge termination and ridge bifurcation. The number of minutiae in a fingerprint varies from print to print and typically a feature extractor reports 30–60 minutiae per print.

A generic automatic fingerprint identification system (AFIS), shown in FIG. 1 consists of four modules (1) image acquisition 100, (2) preprocessing (enhancement) 110, (3) feature extraction 120, and (4) verification or identification via feature matching 140. Typically a fingerprint is captured either by scanning an inked impression of a finger or using a live-scan fingerprint scanner. Preprocessing is often necessary to improve the quality of the fingerprint so that fingerprint features are properly extracted from the image. Finally, authentication is performed by matching the acquired features with those of a database fingerprint.

An ideal sensed or scanned fingerprint image is characterized by smoothly flowing patterns of distinct ridges and valleys. There are two prevalent and well accepted classes of fingerprint features arising from local ridge discontinuities (also known as minutiae): (1) ridge endings and (2) ridge bifurcations. Feature matching is accomplished by comparing the global and/or local distributions of the minutiae properties. Often, the imaging limitations, acquisition condition, age, maintenance of the original impression, as well as skin characteristics cause the acquired image to be far from ideal fingerprints. It is, therefore, desirable to enhance the sensed image, and ensure proper performance of the successive feature extraction and matching modules.

Traditionally, the forensic applications have been the biggest end-users of fingerprint enhancement algorithms, since the important ridge details are frequently obliterated in the latent fingerprints lifted from scene of crime. Being able to enhance these details and/or being able to detect the minutiae can sometimes mean a difference between catching a criminal or not. Also, with the increasing emphasis on the identity fraud in our highly automated and Internet-dependent world, the civil applications (e.g., access control, transaction authorization, social security management, etc.) will need fingerprint enhancement algorithms. In order that positive personal identification is achieved using biometrics, it is imperative that every subject be reliably identified/authenticated using the given choice of biometrics. Some kind of exception processing based (e.g., possession or knowledge) authentication for poor fingerprints poses threat to the integrity of the system and defeats the purpose using biometrics based authentication. Consequently, an AFIS should be able to make the best out of the available data and be able to match every (e.g., you can not afford to annoy a bank customer by asking multiple presentations) biometrics measurement as it is being offered. It is widely known that at least 2–5% of target population have poor-quality (in oriented sinusoid sense) fingerprints: fingerprints that cannot be reliably processed using automatic image processing methods. We suspect this fraction is even higher in reality when the target population consists of (i) older people; (ii) people who suffer routine finger injuries in their occupation; (iii) people living in dry weather or having skin problems, and (iv) people who can have poor fingerprints due to their genetic and racial attributes. With the increasing demand for cheaper and compact fingerprint scanners, the fingerprint verification software cannot afford the luxury of assuming good quality fingerprints obtained from the optical scanner. The cheaper semiconductor scanners not only offer smaller scan area but also significantly poorer quality fingerprints.

PROBLEMS WITH THE PRIOR ART

An image enhancement problem is, in general, hard to solve. There are two main criticisms regarding the performance of existing fingerprint enhancement techniques. First, blocky artifacts are generated as the operations are carried out in small windows and then regrouped. Second, pixel-by-pixel enhancement takes a disproportionately long time compared to ridge extraction, minutiae detection, and feature matching (sophisticated feature estimation may be used to partially improve the performance but only at the expense of speed). Many existing techniques assume that the orientation of the ridges and the frequency of ridges sufficiently characterizes the local fingerprint intensity variations. They model local fingerprint intensities as oriented sinusoids. One of the main purposes of enhancement is to facilitate the extraction of minutiae—but the very assumption of oriented sinusoid for modeling local fingerprint intensities is violated at these minutiae! The same is also true for cutmarks. Essentially the sensitivity parameters (passband) of enhancement filters provide some nominal performance at these points, while introducing blur in other good regions (where models hold true). We believe that a detailed description of spatial characteristics of fingerprints (even more true for general images) is inherently difficult in the frequency domain. As a consequence, designing good adaptive filters in frequency domain is also difficult. Furthermore, there is no simple way to systematically "tune" the existing enhancement filters for handling various types of sensors and acquisition conditions (e.g., at higher noise levels, flatter Gaussians can be used in Gabor filters to reduce the filter sensitivity). From the vantage of computation, the enhancement speed is dependent on the complexity of feature measurement, and also on the size of filters. Frequency-domain enhancement filtering is particularly compute intensive without special-purpose hardware (not an attractive option for desktops and standard workstations).

The following reference is incorporated by reference in its entirety.

Y-C Shin, R. Sridhar, S. N. Srihari and V. Demjanenko, "Local adaptive contrast enhancement", U.S. Pat. No. 5,524,070, June 1996.

In U.S. Pat. No. 5,524,0170 to Shin et al., a method to enhance the contrast of a grey-scale image locally and adaptively is described. The method has been used in the context of optical character recognition. A threshold is used to binarize the grey scale image in order to separate the background from the foreground. For each pixel in the image, a local window centered at that pixel is considered and the mean and the standard deviation of the image intensity in that window are determined. If the standard deviation is high, then the pixel is left as it is. When the standard deviation is low, a piecewise linear function determined empirically is used to scale the pixel's intensity and add an offset to it. The intention is to enhance the contrast of the pixel. The scheme is too naive for effective fingerprint enhancement. Contrast stretching alone does not solve the problem of effective fingerprint enhancement.

K-R Peters, "Digital Pixel-Accurate Intensity Processing Method for Image Information Enhancement", U.S. Pat. No. 5,592,571, January 1997.

In U.S. Pat. No. 5,592,571 to Peters incorporated herein, a digital pixel-accurate intensity processing method for image information enhancement is described. The method separates image information into four categories: "large image features", "small special detail", "intensity detail", and "image noise". Smoothing eliminates intensity-defined image components. Detail enhancement recovers intensity-defined image components eliminated by smoothing. Piecewise linear contrast stretching is used to compensate the reduction in image contrast. In case of fingerprint images, small details are very important and these details can get damaged during smoothing.

W. A. Fuss and R. Eschbach, "Image-dependent automatic area of interest enhancement", U.S. Pat. No. 5,581,370, December 1996.

In U.S. Pat. No. 5,581,370 to Fuss and Eschbach incorporated herein, a method for image-independent automatic area of interest enhancement is described. A histogram is derived from a selected subset of local histograms representing regions of the image. A filter is applied on the histogram to weaken the strong peaks and valleys of the signal describing the histogram. The filtered histogram is used for adaptively stretching the contrast of the image. Contrast stretching alone does not solve the problem of effective fingerprint enhancement, because it does not enhance the image.

A. Kundu and V. Ramamoorthy, "Image Enhancement System" U.S. Pat. No. 5,218,649, June 1993.

In U.S. Pat. No. 5,218,649 by Kundu et al. incorporated herein a system for enhancing the quality of an image that suffers from staircase effects, contouring effects, and granular noise is disclosed. In this system, the edge and nonedge regions are identified, and then those regions are filtered in order to reduce the specific type of quality degradation that generally occurs in the specific type of region. The method cannot be extended to fingerprints since a wider variety of local discontinuities occur.

Y-T Kim, "Image Enhancement Method and Circuit Using Quantized Mean-Matching Histogram Equalization", U.S. Pat. No. 5,937,090, August 1999.

An image enhancement method using histogram equalization of an image signal is described in U.S. Pat. No. 5,937,090 to Kim for displaying the said signal. The disclosed method utilizes cumulative density function of a quantized version of the said image signal. Although histogram equalization improves the visual quality of fingerprint images, it does not deal with structural damages like cuts, pores, etc. Again, this method does not enhance the image.

C. Chatterjee and V. P. Roychowdhury, "Methods and Apparatus for Enhancing Gray Scale Images", U.S. Pat. No. 5,604,545, February 18, 1997.

Chatterjee et al. disclosed in U.S. Pat. No. 5,604,545 a method for image enhancement where the image signal is divided into a set of regions, and a separate linear function is used for each of the regions to produce the enhanced image. However, this method is not detail specific enough to handle fingerprint images.

T. Kamei, "Apparatus For Extracting Skin Pattern Features and A Skin Pattern Image Processor Using Subregion Filtering", U.S. Pat. No. 6,018,586, January 2000.

In U.S. Pat. No. 6,018,586 to T. Kamei a method for extracting features such as ridge directions, ridge line pitches or their combination from skin images is described. A method for enhancing the ridges is also described. A plurality of two-dimensional filters is designed according to kinds of features to be extracted. The skin image is filtered with each of the plurality of filters. The contrast/image intensity of each subregion of the skin image is computed and these are compared with each other. The filter which gives the highest image intensity is chosen as the filter for that subregion and the feature corresponding to the filter is chosen as the feature for that subregion. There is no learning involved to learn the filters based on the data so fingerprint image subtleties are not accounted for.

R. Eschbach and W. A. Fuss, "Image-Dependent Sharpness Enhancement" U.S. Pat. No. 5,363,209, November 1994.

In U.S. Pat. No. 5,363,209, Eschbach and Fuss describe a method of sharpness enhancement of a color image signal. The said method increases maximum local contrast to a predetermined value and all other contrast to a proportional level. Contrast stretching alone does not solve the problem of effective fingerprint enhancement.

R. D. Capello and G. R. Mabry, "Method and Apparatus for Contextual Data Enhancement", U.S. Pat. No. 5,187,747, February 1993.

In U.S. Pat. No. 5,187,747 to Capello and Marby, a method for fingerprint image enhancement here enhancement is performed based on intensity distribution along the direction of the fingerprint ridge with respect to the local mean intensity, and distribution of orientation vectors along the direction of the fingerprint ridge is described. A problem here is that the filters are not tuned to minutiae features.

These limited models and methods, however, cannot be very effective in enhancing poor-quality fingerprints resulting from pressure variation, smudginess, dryness and so on. Also, fixed sets of filter coefficients cannot be effective for wide kinds of fingerprints which are acquired using different sensor characteristics, population etc.

O. Oyamada, "Method and apparatus for producing an enhanced two grayscale image", U.S. Pat. No. 5,832,123, November 1998.

In U.S. Pat. No. 5,832,123 to Oyamada, a method for binary image enhancement so that they are less jagged and more smooth than those in the original input image is outlined. This work is related to binary image enhancement and is not applicable to the grayscale fingerprint images.

Y. S. Ng and M. A. Pickup, "Resolution enhancement system for combined binary and grayscale halftone images", U.S. Pat. No. 5,600,761, February 1997.

In U.S. Pat. No. 5,600,761 to Ng and Pickup a method for determining if the data is grayscale or binary, and if it is binary, doing binary edge enhancement is described. The enhancement algorithm is applicable to binary image enhancement and is not useful for the grayscale fingerprint images.

R. Loce and M. S. Cianciosi and J. D. Kingsley, "Image resolution conversion method that employs statistically generated multiple morphological filters", U.S. Pat. No. 5,579,445, November 1996.

Loce et al. introduce a method for automating the design of optimal filters for print quality enhancement of binary images. The enhancement algorithm is only applicable to binary image enhancement.

M. Mancusso, R. Poluzzi and G. Rizzotto, "Fuzzy logic filter for reducing noise and sharpening edges of digital image signals"

U.S. Pat. No. 5,757,977, August 1998.

Mancusso et al. teach a method of detecting and reducing noise using a fuzzy rules, involving enhancing the edges with no specific details for fingerprint images.

K-R Peters, "Digital Pixel-accurate intensity processing method for image information enhancement", U.S. Pat. No. 5,715,334, February 1998.

Peters uses selectively smoothing an image pixel with the neighboring pixel(s) if the neighboring pixel(s) fall within a (user specified) range of grayscale values with respect to the given pixel grascale value. Again, this method does not take advantage of the underlying structural properties of fingerprint images.

These limited (general purpose) models and methods, however, cannot be very effective in enhancing poor-quality fingerprints resulting from pressure variation, smudginess, dryness and so on. Also, a fixed set of filter coefficients cannot be effective for the wide kinds of fingerprints which are acquired using different sensor characteristics, population etc. Further, most of the enhancement prior art is based on sharpening edges which is not always desirable (e.g., a fingerprint cut is an edge which is an undesirable artifact for automatic fingerprint matching).

Except for U.S. Pat. No. 5,579,445 (Loce et al), none of the enhancement algorithms can be easily trained or learn automatically to adapt to finger image characteristics of a given fingerprint image population. None of the above approaches, except for U.S. Pat. Nos. 6,018,586 and 5,187,747, solve the enhancement problem in the context of fingerprints because contrast stretching is just one of the many approaches that fingerprint enhancement. That is, contrast stretching is not a fingerprint specific approach.

The following references are incorporated by reference in their entirety:

P. Bakker, L. J. van Vliet, and P. W. Verbeek, "Edge Preserving Orientation Adaptive Filtering", Proc. CVPR, pp. 535–540, 1999.

In this paper the authors describe a generalized Kuwahara filter-based orientation-adaptive method for edge-preserving smoothing of seismic data. This approach does not extend to fingerprints where a wider variety of local discontinuities are seen.

K. E. Barner, A. M. Sarhan, and R. C. Hardie, "Partition-based weighted sum filters for image restoration", IEEE Transactions on Image Processing, vol. 8., no. 5, pp. 740–745, 1999.

The paper describes an image restoration technique involving partitions determined by Vector Quantization. It requires a priori knowledge of the spectrum of the noise-free image as well as the spectrum of noise, which is not easily estimated from fingerprint image collections.

L. Hong, Y. Wan, and A. Jain, "Fingerprint image enhancement: Algorithm and evaluation," IEEE Trans. on Pattern Analysis and Machine Intelligence, vol. 20, no. 8, pp. 777–789, 1998.

Here a Gabor filter based enhancement technique is described. Block-wise frequency of the ridges is computed. Block-wise ridge orientation is also computed. The filters are tuned to the local ridge frequency and ridge orientation. However, frequency and orientation alone do not characterize the local neighborhood of fingerprint images, as noted above.

T. Kamei, and M. Mizoguchi, "Image filter design for fingerprint enhancement," Proc. ISCV'95, Coral Gables, Fla., pp. 109–114, 1995.

Kamei and Mizoguchi defined an energy function for selecting the image features from a set of bandpass-filtered fingerprint images, according to a smoothness measure. An enhanced image is produced using the features that minimize the smoothness functional from the filtered images. There is no learning involved from the fingerprint data sets.

L. O'Gorman, "Matched filter design for fingerprint enhancement," pp. 916–919, 1989.

O'Gorman proposed a pixel-by-pixel image enhancement technique by application of oriented, matched filter masks. He also attempted to quantify and justify the functional relationships between image features and filter parameters so that the design process can be easily modified for different conditions of noise and scale. However, this method is based on global features that do not capture local details and with no learning involved from the data sets.

B. G. Sherlock, D. M. Monro, and K. Millard, "Fingerprint enhancement by directional Fourier filtering," Proc. IEE on Vis. Image Signal Process., vol. 141, no. 2, pp. 87–94, 1994.

Enhancement of sensed fingerprint images is achieved by global prefiltering in the frequency domain using a bank of bandpass filters. The enhanced values at high-curvature regions, i.e., near core and delta are obtained by "appropriately weighted" combination of pixel values from two or more prefiltered images. The method generates several enhanced images from which a final image is obtained by appropriately combining these images. The method is computationally inefficient, and, as noted above, frequency based filters do not represent the minutia detail in fingerprints.

All existing fingerprint enhancement techniques are, in principle, based on local estimation of ridge orientation, and ridge frequency, followed by convolution with a parametric filter function, "tuned" to that orientation and frequency. Recent examples of frequency and orientation-selective filters include Gabor filter-banks, and directional bandpass filters. Gabor filters have both frequency-selective and orientation-selective properties and have optimal joint resolution in both spatial and frequency domains. These are parametrically characterized by orientation, frequency, and sensitivity (standard deviations of the Gaussian envelop control sensitivity). Enhancement of sensed fingerprint images is achieved by global prefiltering in the frequency domain using a bank of bandpass filters in Sherlock et al. The enhanced values at high-curvature regions, i.e., near core and delta are obtained by "appropriately weighted" combination of pixel values from two or more prefiltered images. Kamei and Mizoguchi defined an energy function for selecting the image features from a set of bandpass-filtered fingerprint images, according to a smoothness measure. An enhanced image is produced using the features that minimize the smoothness functional from the filtered images. O'Gorman proposed a pixel-by-pixel image enhancement technique by application of oriented, matched filter masks. He also attempted to quantify and justify the functional relationships between image features and filter parameters so that the design process can be easily modified for different conditions of noise and scale.

OBJECTS OF THE INVENTION

An object of this invention is an improved system and method for using biometrics. Another object of this invention is an improved system and method to improve the visual quality of the fingerprint images.

Another object of this invention is an improved system and method to enhance the visual quality of fingerprints for subsequent visual inspection.

Another object of this invention is an improved system and method to make the fingerprint images more amenable for automatic fingerprint processing.

SUMMARY OF THE INVENTION

We propose a new approach to fingerprint enhancement using partitioned least squares filters. Given a small, but representative, set of fingerprints and the corresponding set of desired binary ridge maps (drawn by an expert), a set of adaptive least squares enhancement filters are learned off-line. On-line enhancement is achieved by adaptively convolving the sensed image with appropriate filters. Good on-line enhancement performance is achievable when the training set is a good representative of the sensed fingerprint. A single enhancement filter cannot give good performance over a large number of sensed fingerprints, because least square estimation, in principle, is susceptible to outliers. In order to reduce the error in least squares fit, the sensed fingerprint space is partitioned and a least-square filter for each partition is generated. A hierarchical partitioning scheme is proposed for fingerprint enhancement to simultaneously reduce the least squares error and the computational complexity of the enhancement process. The partitioning scheme employs image-domain and sensor-domain (e.g., inked, live-scan) information, as well as domain knowledge of the subject, e.g., race, sex, age, profession (artisan vs. not) and so on. Partitioning of orientation and frequency space is performed like in many existing methods. Additional partitions in terms of ridge/valley/transition, amplitude, quality, and ridge discontinuity are also generated. While sophisticated partitioning may improve the enhancement performance, these also increase the computational burden for the on-line enhancement process. On the other hand, a large number of simple partitions can improve the enhancement performance without reducing the speed. Memory considerations for storing filter coefficients are insignificant.

It is well-known that least squared filters belong to the class of Wiener filter, which is the optimal linear filter. But it requires a priori knowledge of the spectrum of the noise-free image as well as the spectrum of noise. We circumvent this limitation by providing the binary ridge maps corresponding to a training fingerprint. This may be infeasible for a noisy gray-scale image, but can be easily performed by a human for fingerprints.

DETAILED DESCRIPTION OF THE INVENTION

Fingerprint images are extremely rich source of data. The fingerprint characteristics (e.g., ridge height, ridge width, quality) may be significantly different for different target populations. Further, the statistics of the fingerprint characteristics of a target population can potentially be dynamically changing due to any number of extrinsic (e.g., weather) or intrinsic (e.g., population shifts) conditions. Typically, the poor quality fingerprints due to (say) bad weather (e.g., dry) conditions may be completely different in appearance than the poor quality fingerprints due to (say) bad skin conditions (e.g., excessive sweat). These different poor quality fingerprints may require different and peculiar image processing methods to correctly and effectively enhance their appearance and to make the fingerprint ridge information more conspicuously visible. Under such conditions, it is desirable that a fingerprint enhancement algorithm can automatically adapt to the characteristics of the (poor quality) fingerprints. Further, different portions of a poor quality fingerprint image may have different characteristics (for example, top-left region of a fingerprint may be poorly visible due to sweat while the bottom-right portion may be poorly visible due to a callus). Based on image characteristics of fingerprint portions (sub region), this invention automatically and differently processes the different portions of fingerprint image of the target population to accurately enhance the detailed information contained in the fingerprint. Further, the correct method of processing for different types of poor quality portions of image is automatically learned from example images provided by the system. Because the system learns the correct processing method from the typical samples/examples, this invention can easily and automatically adapt to different poor quality fingerprints from different fingerprint populations.

Figure 1:
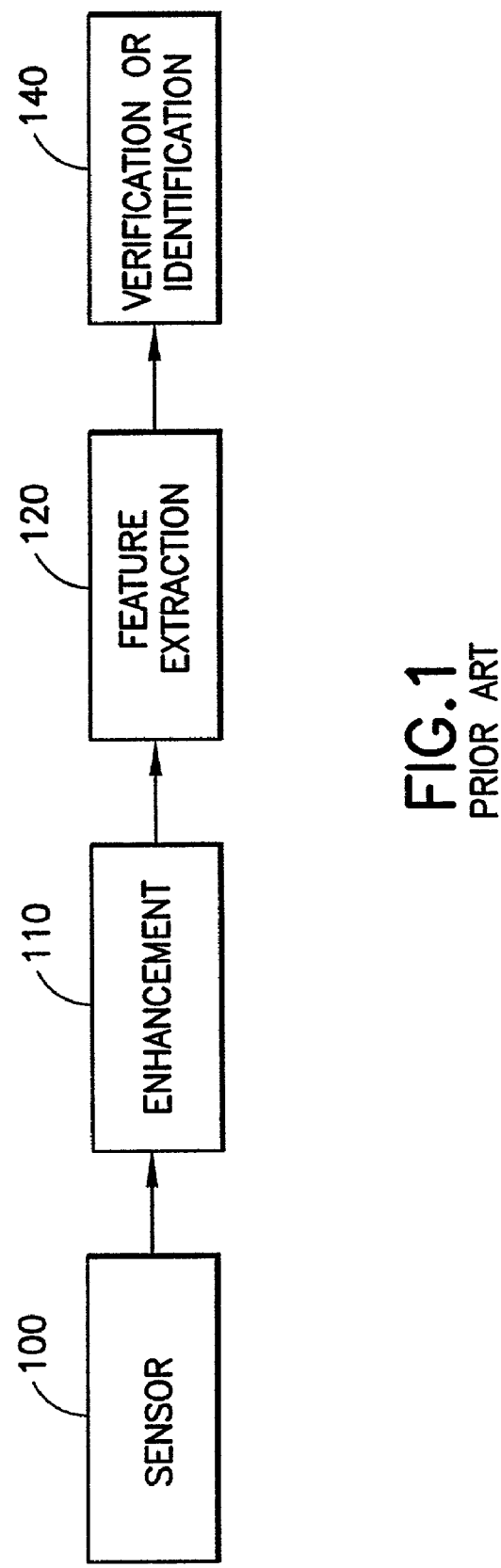
FIG. 1 shows the components of a typical Automatic Fingerprint Identification System (AFIS).
Figure 2:
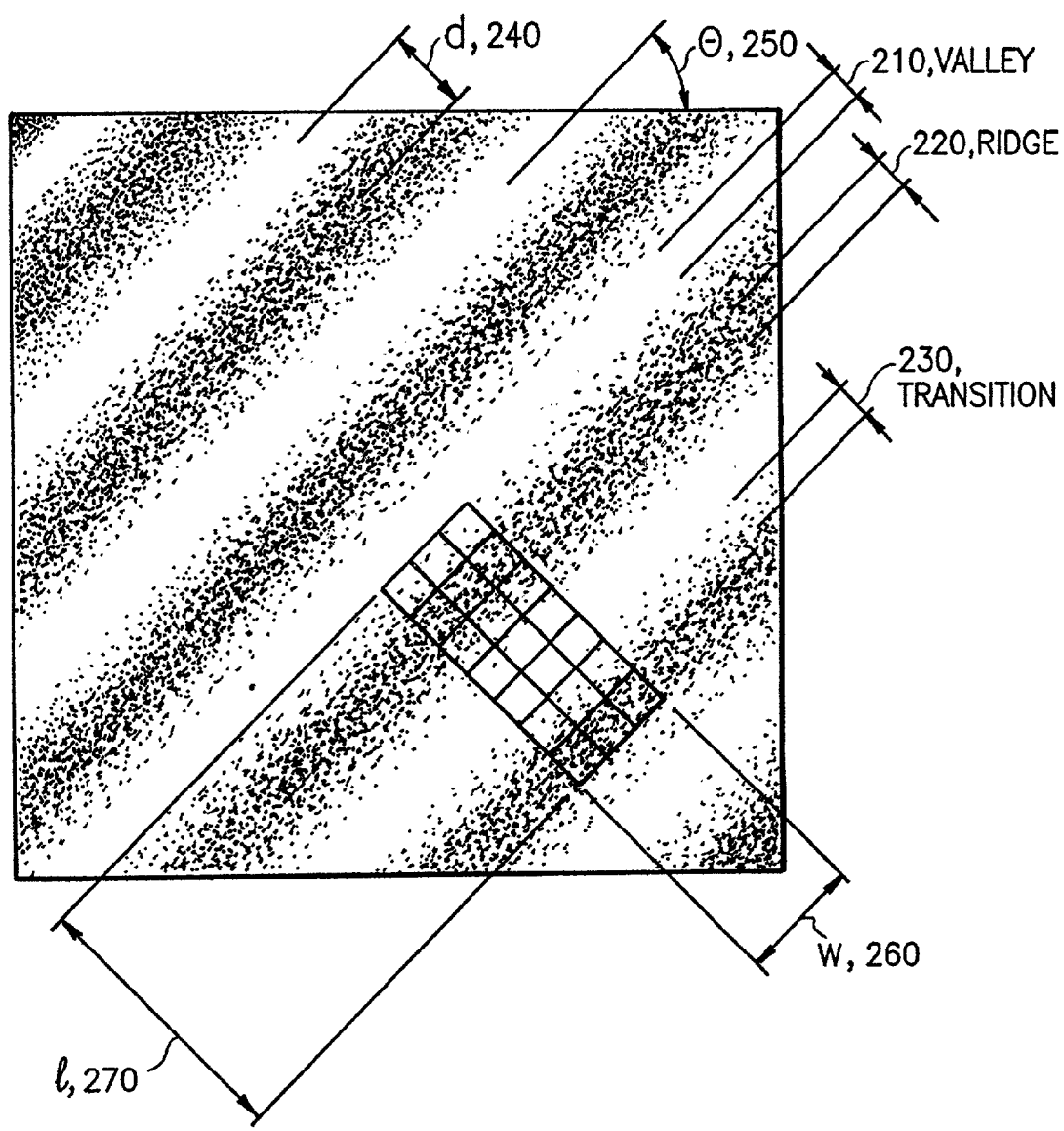
FIG. 2 shows the local neighborhood of a fingerprint consisting of alternating ridges and valleys. It highlights the fact that ridges and valleys in a local neighborhood are parallel. It also shows a window centered at a pixel.

In FIG. 2 a subregion of a gray scale fingerprint image is shown. The brighter region is the valley (210) and the darker region is the ridge (220). The transition region(230) is the valley fading in to the ridge region. The spacing between the ridge peak and the valley peak is the measure d (240) and the orientation (250) of the ridges is the predominant direction of the flow of the ridges. An oriented filter of l×w (260, 270) is also shown in FIG. 2. These definitions are used in the following description.

Figure 5:
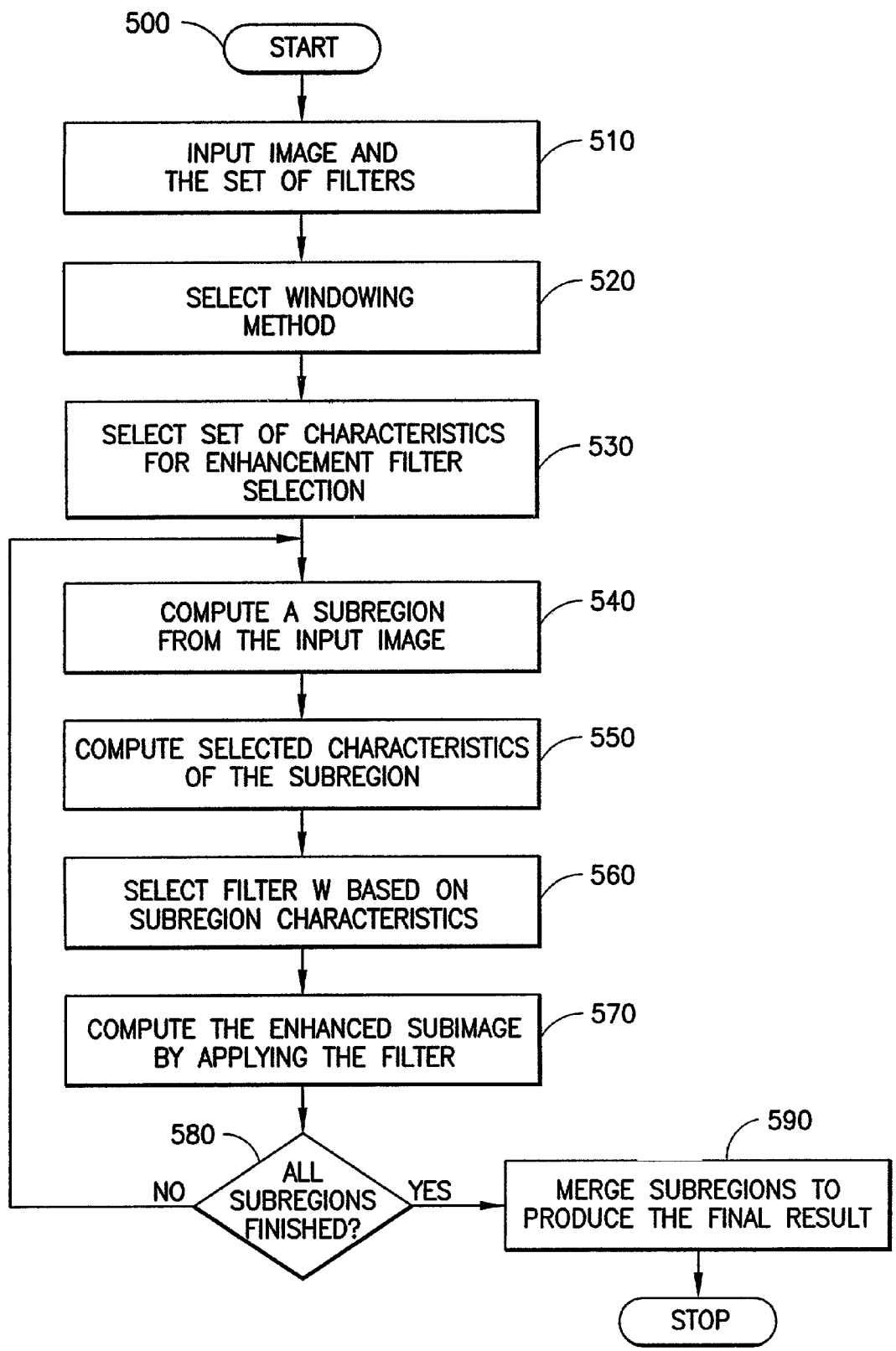
FIG. 5 gives the flowchart for enhancing an input fingerprint image using the learned filters as a result of the training process.
Figure 6:
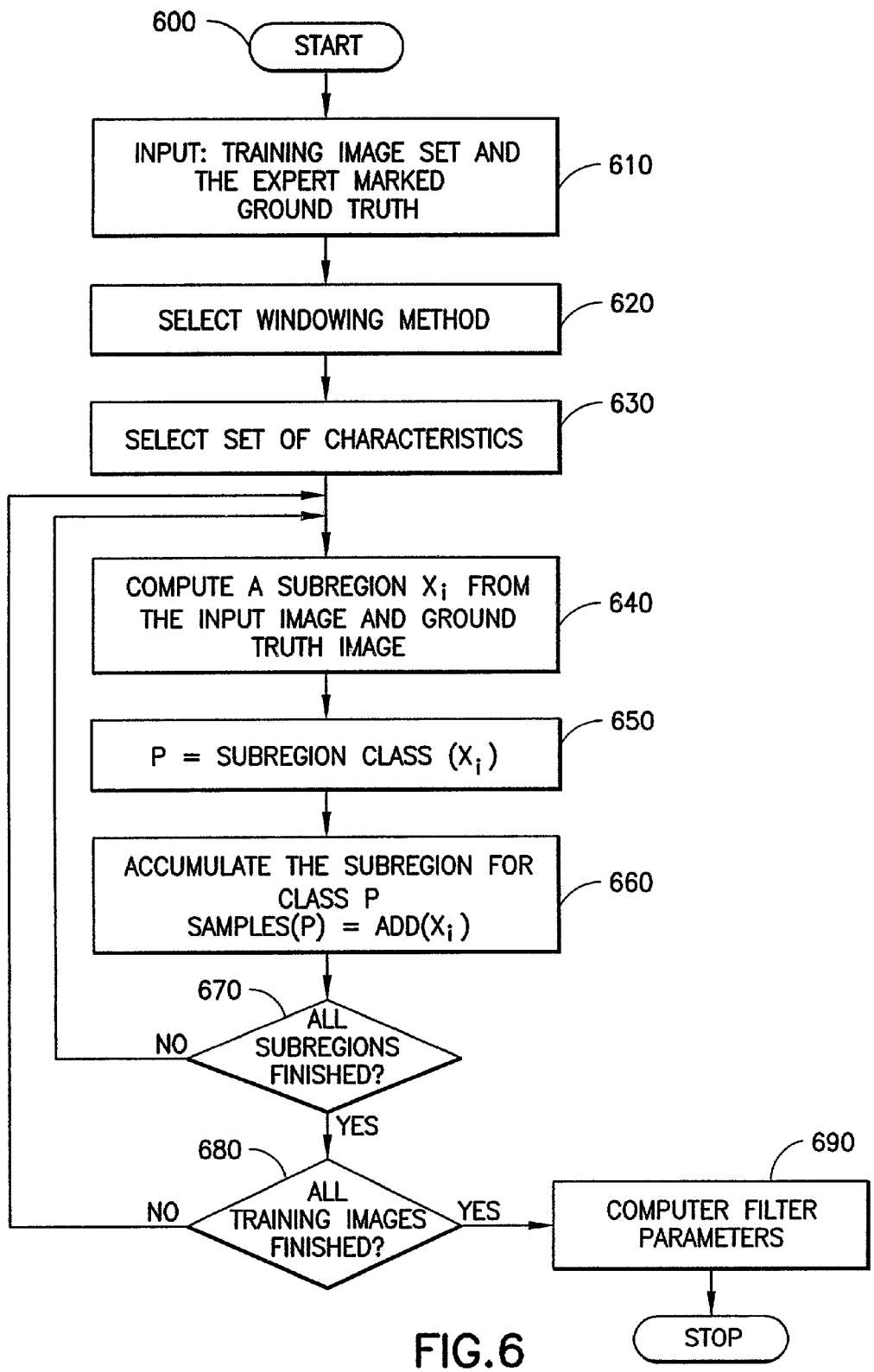
FIG. 6 gives the flowchart for the filter learning process.

The idea underlying the invention is that the different methods of enhancement processing are needed for different types of different poor quality images and different types of different poor quality image portions. The invention for which the learning part is shown in FIG. 6 describes methods for (a) dividing an image into sub regions (620) (also called as blocks, window) (b) determining a type (650) (e.g., class, partition) each image/sub region (c) learning the specific enhancement method (690) corresponding to each type (e.g., class, partition) each image/sub region from a set of training image/data set (610); (d) for a given poor quality image to be enhanced, applying the specific enhancement method (500) described in FIG. 5, corresponding to each type (e.g., class, partition) each image/sub region;

Learning the specific enhancement method (600) corresponding to each type (e.g., class, partition) each image/sub region from a set of training image/data set will be referred to as enhancement learning, transformation learning, or learning of enhancement filter coefficients. Applying the specific enhancement method (500) corresponding to each type (e.g., class, partition) each image/sub region will be referred to as enhancement or transformation or filter convolution/application. Thus, first the enhancement methods are learned from a training image/data set and then, these learned enhancement methods can be applied to a given poor quality image to be enhanced. Thus, the invention consists of two major steps: (1) enhancement learning, transformation learning, or learning of enhancement filter coefficients. (2) enhancement or transformation or filter convolution/application. Both of these steps involve (a) dividing an image into sub regions (520, 620) (b) determining a type (e.g., class, partition) each image/sub region (550, 650). Below, enhancement learning, transformation learning, or learning of enhancement filter coefficients step is described first. It is followed by a detailed description of the enhancement or transformation or filter convolution/application.

More specifically, the learning enhancement step requires a set of example pairs 610 of (poor quality, enhanced quality) images. This set is also referred to as training image/data set; the poor quality images constitute the input/raw image training set and the corresponding enhanced quality fingerprint set constitute enhanced image training set. The example pairs can be obtained from an expert who given a set of typical poor quality fingerprint images (input/raw image training set), generates the corresponding enhanced fingerprint images (enhanced image training set) by closely visually examining the poor quality. The training image/data set can also be obtained from any other methods including any combination of (a) existing automatic enhancement algorithms which have been assessed to perform effective enhancement for given set of input/raw image training subset and (b) enhancement by a fingerprint expert. For example, a prior art enhancement algorithm A does a good job of enhancing the smudgy poor quality fingerprints in the input/raw image training set and prior art enhancement algorithm B does a good job of enhancing some of the non-smudgy poor quality fingerprints in the input/raw image training set, then algorithms A and B together with a fingerprint expert can employed to obtain the corresponding training image/data set.

Given a (poor quality, enhanced quality) image pair from the training image/data set, first each image is divided into sub regions (640). The process of dividing the image into sub regions is identical for each poor quality training image and enhanced quality image. For example, if the poor quality image is divided into 25 square 4×4 non-overlapping sub-images, so should be the enhanced quality image. Consequently, there is a one-to-one mapping from each poor quality image sub region to each enhanced quality image sub region. The division of an image into sub regions can be accomplished in any number of different methods; each method resulting in differently shaped individual sub regions, different number of sub regions, and/or different spatial overlap among the constituent sub regions. For example, a 256×256 pixel size image can be divided into 4 non-overlapping quadrants of 128×128 pixel size square shaped sub regions, 16 non-overlapping square shaped sub regions, each with a 64×64 size sub regions, or 20 overlapping sub regions, 16 of which are of size 64×64 and 4 of which are of size 128×128. Similarly, an image can be divided into rectangular, hexagonal, or any other shaped sub regions which may or may not be spatially overlapping, but should cover the complete image.

The division of an image into sub regions may be governed by any number of the local image characteristics, global (overall) image characteristics. It may also be governed by the application for which the image enhancement is being used, and/or the characteristics of the subjects to whom the images belong. For example, very smudgy fingerprint images may be divided into a higher number of sub regions than relatively cleaner (good quality) raw training images. The division of an image into sub regions may be either predetermined either by an expert or by the input training set. The exact specification of division of an image into one or more sub regions is determined by any one or more of the following: a pixel-wise amplitude of the sub region, an average amplitude of the sub region, an image frequency of the subregion, an orientation of the sub region, an amplitude transition in the orientation direction, a local contrast, a local phase, a scalar quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image. In a preferred embodiment, the image divided into a pre-determined number of non-overlapping square sub regions/blocks of size 16×16; each pixel is represented in exactly one sub region/block. In another preferred embodiment, the image is divided into a predetermined number of square sub regions/blocks of size 16×16 and of size 32×32; each pixel being represented by two blocks, one of size 16×16 and the other of size 32×32.

Once the training set images have been divided into sub regions, each sub region from the raw/input training image set is classified into one or more classes 650. The classes can also be referred to as partitions. The partitioning or classification of a region into a class can be governed by any number of local sub region characteristics, global (overall) image characteristics, global (overall) sub region characteristics, the application for which the image enhancement is being used, and/or the characteristics of the subjects to whom the images belong. Examples of local characteristics that can be used for the partitioning include (1) orientation, (2) frequency, (3) local contrast, (4) phase, and (5) intensity discontinuity in the direction of orientation vector, (6) scalar quantization of intensity values, (7) vector quantization of intensity values. The characteristics 630 used for classification may be one or more of the following: a pixel-wise amplitude of the sub region, an average amplitude of the sub region, an image frequency of the subregion, an orientation of the sub region, an amplitude transition in the orientation direction, a local contrast, a local phase, a scalar quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image. The subject, sensor, working environment characteristics can also be used for deciding sub region class. As mentioned earlier, 2–5% of the target population have poor-quality (in oriented sinusoid sense) fingerprints. We suspect this fraction is even higher in reality when the target population consists of (i) older people; (ii) people who suffer routine finger injuries in their occupation; (iii) people living in dry weather or having skin problems. Also, statistically, fingerprint characteristics are quite different based on sex or race of a person. Thus, fingerprint space can be partitioned, based on the attributes of a target population, i.e., age, sex, and race. Also, fingerprint image characteristics vary based on the sensor type, i.e., optical vs. livescan, scanned from paper vs. Real-time, as well as acquisition environment, e.g., clean vs. usual vs. dirty. Thus partitions can be created for different sensor types and acquisition scenario. For each of these partitions, additional partitions are defined based on the local fingerprint characteristics.

One particular method of classification of a sub region into one or more classes is by classification of the individual characteristic. For instance, say image subregion can be characterized by the sub region image quality and the sub region image contrast. Further, the image quality may itself be quantified into three classes (partitions, types or values) of image quality (e.g., dry, smudgy, normal) and the image contrast may be quantified into two classes (partitions, types, or values) of image contrast (e.g., high contrast and low contrast). Consequently, the image sub region may be classified into six classes/parititions (e.g., dry-high contrast, dry-low-contrast, smudgy-high-contrast, smudgy-low-contrast, normal-low-contrast, and normal-high-contrast). In a preferred embodiment, the total number of sub region classes is the product of the number of partitions in each individual characteristic classes. In another preferred embodiment, the total number of sub region classes is related to the number of partitions in each individual characteristic classes by vector quantization partitioning method which described below. A pixel included in the sub region may belong to multiple classes if the pixel is represented by more than one sub region.

Vector Quantization Based Partitioning

Let $A_1, A_2, \ldots, A_n$ be the attributes that are used for partitioning. For instance (frequency, orientation, amplitude) could be the three attributes used for partitioning. Suppose we have a representative set of fingerprint images chosen from a database of fingerprints. For each pixel or image block in this set of images we form an n-tuple $(a_1, a_2, \ldots, a_n)$ where $a_i$ is the value of the ith attribute for that pixel. Each such n-tuple is a point in an n-dimensional metric space. A clustering technique such as the k-means algorithm is used to discover clusters of these points. Each cluster represents a partition. The cluster center is used for partitioning the pixels of an input fingerprint image. Let x be a pixel in the input fingerprint image and let $(a_1, a_2, \ldots, a_n)$ be the n-tuple corresponding to x. Suppose we have identified K clusters. We determine to which cluster the pixel represented by $(a_1, a_2, \ldots, a_n)$ belongs to.

What particular image/subject/application characteristics (630) to be used for sub region classification can be determined by an expert or by an automatic pattern recognition method. For example, the enhancement learning system may use only image amplitude or it may use image quality/amplitude. In the preferred embodiment, the image amplitude, orientation, an amplitude transition in the perpendicular orientation direction, image quality, and ridge frequency image characteristics are used for sub region classification.

How many classes/partitions of the each image/subject characteristics be used can be determined by an expert or by an automatic pattern recognition method. In the preferred embodiment, the number of classes of the image characteristics is empirically determined from a sample training set.

Below, a detailed description of the image characteristics and the individual classification/partitioning of these individual characteristics is described.

Orientation and Frequency Partitioning

A preferred way of computing orientation and frequency characteristics is described in the following paper:

Hong, Y. Wan, and A. Jain, "Fingerprint image enhancement: Algorithm and evaluation," IEEE Trans. on Pattern Analysis and Machine Intelligence, vol. 20, no. 8, pp. 777–789, 1998.

Other prior art methods may also be employed.

Amplitude Partitioning

Figure 4:
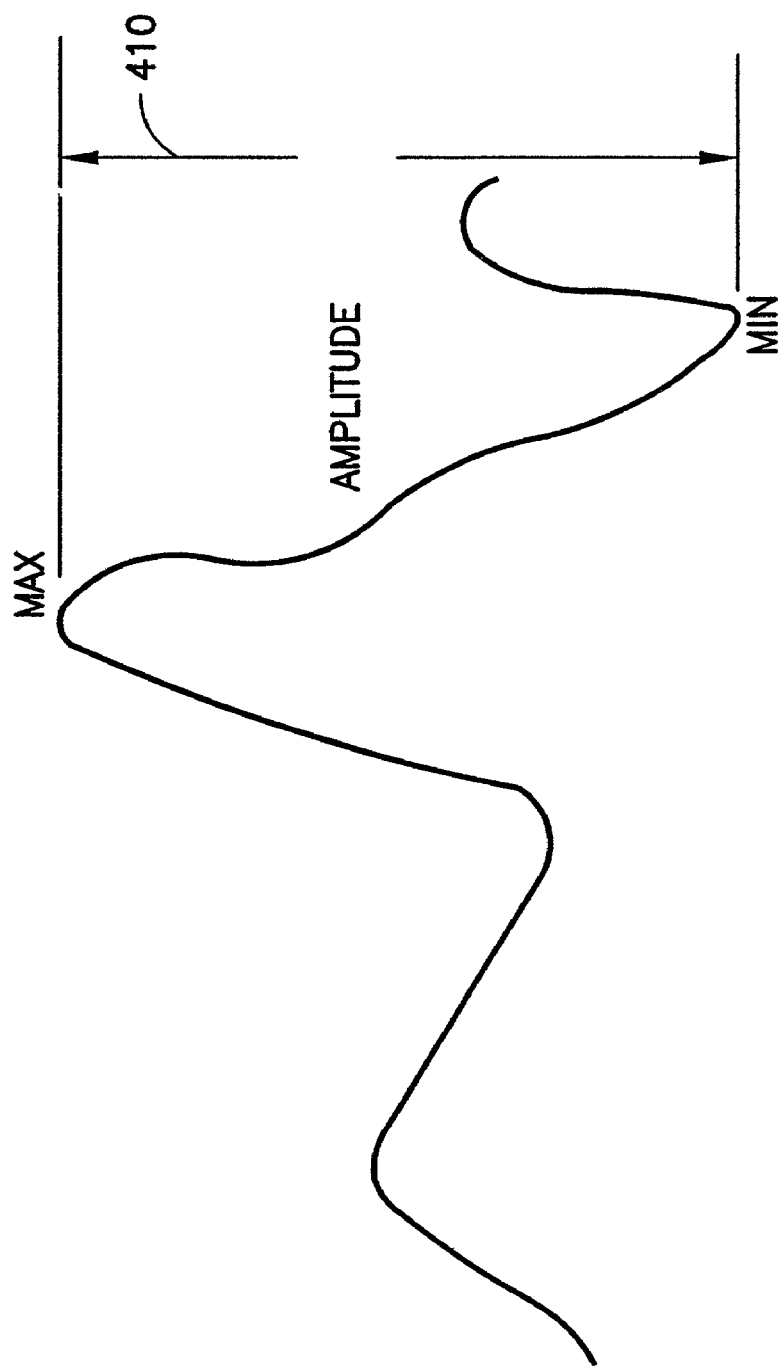
FIG. 4 defines the amplitude of intensities in an image.

Qualitatively, amplitude captures the local ridge-to-valley contrast. Amplitude at pixel i can be estimated by analyzing the projection of the image along a line segment perpendicular to the orientation vector and passing through the pixel. Let MIN and MAX be, respectively, the minimum and maximum of pixel intensities in the l×w rectangular window, as shown in the FIG. 4. The dimension should be set so that at least one ridge/valley pair passes through the rectangle. In one embodiment, amplitude (410) can be simply computed as, Amplitude=MAX−MIN Depending on input noise, calculated MAX and MIN, and consequently amplitude may be incorrect. Amplitude estimated is refined by first sorting the intensity values in the window, and then using say 90% of the data in the middle to make it less dependent on outliers. That is, Amplitude=sorted_list[(int)(0.95×l×w)]−sorted_list[(int)(0.05×l×w)]

Where sorted_list[ ] is the list of intensity values in the ascending order. In another embodiment, a 1-D sinusoidal signal is constructed from the pixel intensity values in the window and amplitude of this sinusoid is calculated. For a wide variety of fingerprints, it is sufficient to segment the fingerprint space into 4–6 amplitude partitions (820, 840, 860 880). That is

```
If (ampitude < t₁) (810)
    Amplitude_Partition = 1 (820)
else if (amplitude < t₂) (830)
    Amplitude_Partition = 2 (840)
.....
else if (amplitude < tᵢ) (850)
    Amplitude_Partition = i (860)
.....
else (870)
    Amplitude_Partition = N (890)
``` where $t_1, t_2, \ldots, t_i, \ldots, t_N$ are the thresholds for partitioning the amplitude space. These can be distributed uniformly or chosen such that during training time there are equal number of training samples in each partitions. The latter scheme is expected to give better performance in many cases. Amplitude partitioning produces uniform ridge-to-valley contrast in the enhanced image. global threshold can be applied to detect ridges from the enhanced image. Global normalization cannot achieve this performance. In a preferred embodiment amplitude is partitioned into 3–6 partitions, typically, 4 partitions were used. The amplitude is typically in the range [0–255]. So the five partitions are 0–63, 64–127, 128–191, 192–255.

Frequency Partitioning

Ridge/Nalley frequency is an important structural characteristic of a fingerprint. Locally, the ridges and valleys of a fingerprint are parallel. By frequency, we mean the number of ridges/valleys per unit area. Let $f$ denote the frequency of an image block. The partitioning of the pixels based on frequency is achieved as follows:

```
If (f<f₁) (910)
    Frequency_Partition = 1 (920)
else if (f<f₂) (930)
    Frequency_Partition = 2 (940)
.....
else (970)
    Frequency_Partition = k. (990)
```

Here, k>0 is the number of frequency partitions, and $0 <= f_1 < f_2 < \ldots < f_k$ are positive numb representing frequencies.

Quantitatively, frequency captures the notion of ridge width. The width of ridges and valleys vary across fingerprints and within the fingerprint. Intuitively, pixels on ridges with different widths should be processed differently. Frequency partitioning is intended to do so. In a preferred embodiment, frequency has been partitioned into 2–6 partitions, typically, 4 partitions are used. The frequency is typically in the range [0–16]. So the four partitions are 0–4, 5–8, 9–12, and 13–16.

Quality Partitioning

Different portions of a typical fingerprint image are of different quality. Quality is a block-level characteristic. Let Q(x) denote the quality of the image block to which pixel x belongs.

Intuitively, Q(x) falls into three categories: Good, Poor, and Average. A block-level quality estimator determines the quality of every image block in the fingerprint. The block-level quality takes a value in the region [0,1] with 0 denoting extremely poor quality blocks and 1 denoting excellent quality blocks. Given a pixel x, it is classified into one of k>0 quality classes as follows:

```
If (Q(x) < q₁) (1010)
    Quality_Partition = 1 (1020)
else if (Q(x) < q₂) (1030)
    Quality_Partition = 2 (1040)
....
else (1070)
    Quality_Partition = k. (1090)
Here, q₁, q₂, ..., qₖ are positive constants such that
Q <= q₁ < q₂ < ... < qₖ = 1.0.
```

The intention behind quality partitioning is that good quality regions should be just smoothed by the enhancement filters while poor quality regions should be enhanced. In a preferred embodiment, quality has been partitioned into 4–6 partitions, typically, 4 partitions are used. Quality is typically in the range [0–1]. So the four partitions were 0–0.25, 0.25–0.50, 0.50–0.75, 0.75–1.0.

Quality can be computed as described in R. Bolle et al. "System and method for determining the quality of fingerprint images", U.S. Pat. No. 5,963,656, October 1999.

Ridge/Valley/Transition Partitioning

A fingerprint image consists of a collection of smoothly flowing ridges and valleys. The ridges and valleys alternate and locally they are parallel. A ridge or a valley in a fingerprint image is typically 3–7 pixels wide. The intensity of the ridge (or valley) is usually not uniform throughout its width. Depending on where actually the pixel lies in the configuration of ridges and valleys, an appropriate filter should be applied to it. A pixel can lie on a ridge, or on a valley, or on the transition region. In Ridge/Valley/Transition partitioning, a pixel is classified as a ridge pixel if it lies on a ridge, a valley pixel if it lies on a valley, and a transition pixel if it lies on the ridge/valley transition region. One embodiment of ridge/valley/transition partitioning would classify the pixels in the fingerprint image into three classes, i.e., one class for ridge pixels, one class for valley pixels, and the third class for transition pixels. However, each such class can be further partitioned into subclasses if needed.

Let I(x) be the signature value of pixel x and A(x) be the amplitude of the sinusoid passing through x. Let MAX and MIN be the maximum and minimum value of the sinusoid passing through x. As discussed before, A(x)=MAX−MIN. In the preferred embodiment, we say that pixel x is a ridge pixel if $I(x) < (MIN + 0.33 \times A(x))$.

We say that a pixel is a valley pixel if $I(x) > (MAX - 0.33 \times A(x))$.

If a pixel is neither a ridge pixel nor a valley pixel then we say that it is a transition pixel. In a more general setting, we could have k>3 ridge/valley/transition classes computed as follows:

```
If (I(x) <= MIN + c₁ x A(x)) (1110)
    RVT_Partition = 1 (1120)
else if (I(x) <= MIN + c₂ x A(x)) (1150)
    RVT_Partition = 2 (1160)
....
else (1170)
    RVT_Partition = k. (1190)
```

Here, $c_1, c_2, \ldots, c_k$ are positive constants such that $0 <= c_1 < c_2 < \ldots < c_k <= 1.0$. amd RVT_Partition is the partition number 1, 2, ..., k. In a preferred embodiment Ridge/Valley/Transition has 3–6 partitions, typically 3 partitions.

Orientation Partitioning

The ridges and valleys of a fingerprint are locally parallel. They have a dominant orientation in a local neighborhood. If the image is divided into blocks of size w×w, where w>1 (typically, 8<=w<=32), then for each such block the dominant orientation of ridges and valleys can be computed. For each pixel x in the image, the orientation O(x) at that pixel is defined to the dominant orientation of the image block to which the pixel belongs. The orientation of a pixel O(x) takes a value between 0 and 180. This range can be divided into k>0 intervals with each range corresponding to an orientation partition.

```
If (orientation < O1) (1210)
    Orientation_partition = 1 (1220)
else if (orientation < O2) (1230)
    Orientation_partition = 2 (1240)
.....
else (1270)
    Orientation_partition = k. (1290)
```

In a preferred embodiment, orientation has been partitioned into 4–12 partitions, typically, 6 partitions are used. The orientation amplitude is typically in the range [0–180]. So the six partitions are 0–30, 31–60, 61–90, 91–120, 121–150, 151–180.

Ridge Discontinuity Partitioning

Qualitatively, ridge discontinuity indicates the presence of cutmarks, minutiae, and blots in inked prints. Ridge discontinuity is a pixel-level characteristic. Let x be a pixel. The derivative of the image at x in the X and Y directions is determined using the Sobel Operator. The derivative of the image in a direction is a measure of the rate of change of the intensity of the image pixels along that direction. The value of the derivative in a particular direction falls in a range $[D_{MIN}, D_{MAX}]$. This range can be divided into a finite number of subranges and pixels can be partitioned based on which subrange they fall in. In the preferred embodiment the derivative Gx along X direction and the derivative Gy along Y direction are computed and the partition is determined as follows:

```
If (Gₓ < Gₓ₁) (1310)
    A = 1 (1320)
else if (Gₓ < Gₓ₂) (1330)
    a = 2 (1340)
else
    a = 3.
If (Gᵧ < Gᵧ₁) (1315)
    b = 1 (1325)
else if (Gᵧ < Gᵧ₂) (1335)
    b = 2 (1345)
else
    b = 3.
RD_Partition = 3 x (a−1) + b. (1397)
```

Here, $Gx_1, Gx_2, Gy_1$, and $Gy_2$ are constants lying in the range $[D_{MIN}, D_{MAX}]$.

Instead of the X and Y directions we could use any two dimensional linear space for partitioning. For instance, we could use the direction along the ridge and the direction perpendicular to it. In a preferred embodiment, ridge discontinuity lies between 4–16, typically 9, and Gx and Gy's are uniformly placed between D_min and D_max.

Orientation Uncertainity Based Partitioning

The ridges/valleys change their direction rapidly at certain portions of the fingerprints and less so in other regions. The rapid changes in orientation of the ridges/valleys are prominent at regions close to cores and deltas. However, at regions away from cores and deltas, the change in orientation is gradual. Clearly, these different type of regions have to filtered differently. The change in orientation around a pixel can be measured by comparing the orientation around the pixel with the orientation of neighboring blocks. Classes are defined on the basis of the amount of change in orientation. Let x be a pixel. Let W be a window of size w×w (w >0) centered at x. Suppose $W_1, \ldots, W_T$ be the blocks (each of size w×w) in the neighborhood of W. Let $O, O_1, \ldots, O_T$ be the orientation of the ridges in blocks $W, W_1, \ldots, W_T$ respectively. Let $U_1$ denote $|O-O_i|$. $O_1$ measures the deviation of the orientation of block $W_i$ from the orientation of block W. Let $U_{avg}$ be the average of $U_1, \ldots, U_T$.

```
If (U_avg < u₁) (1410)
    O_Uncertainity_Partition = 1 (1420)
else if (U_avg < u₂) (1430)
    O_Uncertainity_Partition = 2 (1440)
....
else (1470)
    O_Uncertainity_Partition = k. (1490)
```

Here $u_1, \ldots, u_k$ are non-negative constants chosen appropriately. In the preferred embodiment, the values of w, k, $u_1, \ldots, u_k$ are empirically determined from a set of sample images. In the preferred embodiment w=16, k=2, u1=20 degrees, u2=180 degrees.

So far, the methods of dividing a training (raw, enhanced) image into subregions is described and the methods of assigning a sub region class/partition to the training raw image sub region based on the image/sub region/subject characteristics is described. Application of these methods results in zero or more (raw, enhanced) training image subregion associations per sub region class/partition. Given a reasonable number of (raw, enhanced) training image subregion associations, the enhancement learning method obtains the transformation parameters for transforming the raw sub region of given class/partition into the corresponding enhanced sub region. The method of learning this transformation is either by a human expert (e.g., visual examination), by automatic signal processing method, or by a combination thereof. In a preferred embodiment, the transformation (filter) are learned completely automatically by a signal processing method called least square estimation filter (Wiener filter), which is described below. In a preferred embodiment, orientation uncertainity lies in between 2–6 partitions, typically 4. Uncertainty is in the range [0–180], so the four partitions are 0–45, 46–90, 91–135, 136–180.

Scalar Quantization Based Partitioning

Let x be a pixel. Let $W_x$ be a window of size w×w (w>0) centered at x. $W_x$ is oriented along the dominant ridge direction at x. Let MAX be the maximum intensity value of a pixel in $W_x$ and MIN the minimum intensity value. We assign a value 1 to each pixel y in $W_x$ if $$I(y)>(MAX-MIN)/k$$

and 0 to each pixel y in $W_x$ if $$I(y)<=(MAX-MIN)/k.$$

Typically, k is 2. Here, 1(y) denotes the intensity value of pixel y. The result of this procedure is a binary string of length w×w. This binary string is treated as a number, which gives the partition number. In a general setting, only bits in chosen positions in the window could be used for forming the binary string and determining the partition number. If L is the length of the binary vector, then there are $2^L$ classes. In a preferred embodiment, L is in the range 3–6. We tried L=4, i.e., 16 classes.

Learning Fingerprint Enhancement Filters

Figure 3:
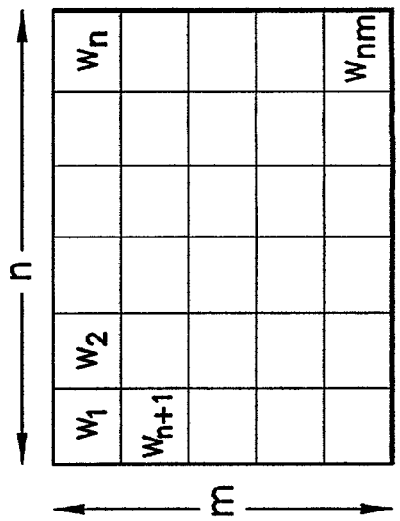
FIG. 3 shows an image neighborhood and enhancement filter definition. It shows an image window of size m×n centered at pixel and the corresponding filter window (also of size m×n).
Figure 3:
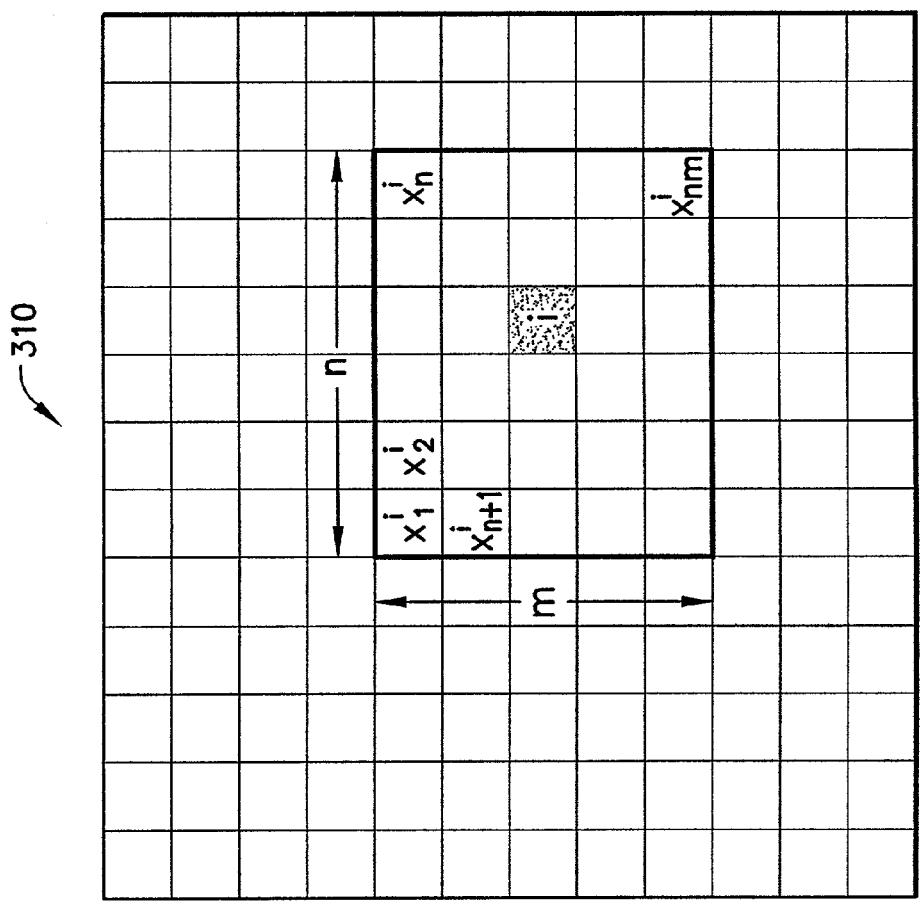

Let us define a neighborhood 310 around a candidate image pixel i from raw training image sub region and an enhancement filter 320 to be applied in pixel i, as shown in FIG. 3. In a preferred embodiment, the neighborhood is an n×m rectangular window. Typically, n is between 1–5. In a preferred embodiment n=3. Typically m is between 3–11. In a preferred embodiment m=7. The filter is also defined in the same window. Let us denote k=nm. Now define a vector $$x_i = [x_1^i, x_2^i, \ldots x_j^i, \ldots, x_k^i], (640)$$

Where $x_j^i$ is the image intensity at the j-th location within the i-th window. Assume $y_i$ is the enhanced intensity at pixel i, provided by a fingerprint expert. Now define a matrix $$X=[x_1, x_2, \ldots x_i, \ldots, x_M]^T$$

where, M is the number of candidate pixels from the same sub region partition/class, and T stands for transpose of a matrix or vector. The idea is to obtain the enhancement filter $$w=[w_1, w_2, \ldots, w_j, \ldots, w_k]^T$$

as an optimal mapping between the sensed raw image space X and the enhanced image space $$Y=[y_1, y_2, \ldots, y_j, \ldots, y_M]^T.$$

Thus the filter function w is obtained by minimizing the least squares mapping error $$F(w)=(Xw-Y)^T(Xw-Y)$$

with respect to w. Differentiating F(w) with respect to w and equating the result to zero, the enhancement filter function is obtained as $$w=(X^TX)^{-1}X^TY. (1670)$$

As long as M>k, the existence of $(X^TX)^-$ is guaranteed, practically due to inherent noise associated with the imaging process. In a preferred embodiment M is at least 10,000, to ensure good performance over different types of fingerprint images. Thus for each sub region class p, $w_p$ is learned using the sample sub region association.

When sufficient samples are not available for a sub region class p from a training set, the training set can be augmented to include more images to obtain sufficient samples for the corresponding class. If eventually, for sub region class p, there are insufficient training samples, transformation filter $w_p$ cannot be learned using the sample sub region association and the sub region transformation is considered to be invalid.

Enhancing Fingerprint Images

The enhancement transformation learning step yields either valid transformation filter $w_p$ (1670) for each sub region class p or flags a particular sub region class q to be invalid.

The method of enhancing a given poor quality image is as follows. The given image is divided into sub regions (540) using the same process of the image division (640) followed at the time of enhancement learning. Each sub region is further classified (550, 1530) using the classification procedure used at the time of enhancement learning. If the transformation filter $w_p$, corresponding to a particular sub region, is valid, the filter $w_p$ is applied/convolved with that sub region to obtain the corresponding enhanced sub region. Once $w_p$ is calculated using a reasonably large M from a representative set of database fingerprint images, it is convolved with a sensed fingerprint image, I to generate the enhanced image. Or, mathematically the enhanced image is given by $$E=I*Wp(1540)$$

where * denotes convolution operator.

If the transformation filter $w_p$ corresponding to a particular sub region is invalid, a number of alternate methods can be used to enhance such a sub region or the corresponding sub region may be left unprocessed. Any one of the following methods of alternate processing can be used to process the sub regions belonging to an invalid class: a valid transformation filter associated with a sub region class most similar to the invalid sub region class may be chosen. The metric of similarity may be determined using some distance metric (absolute difference, weighted Euclidean, Mahalanobis distance metric) defined on the constituent characteristics used for determining the sub region class. For example, if the sub region class was determined using the image contrast class and image amplitude class, a distance metric may be defined on the image sub region contrast value and image sub region amplitude value; this distance metric can be used to determine the sub region class most similar to the invalid sub region class. Alternatively, the image sub regions may computed using a different image division method (e.g., at different image resolution) and resultant subregion class may be used for determining the transformation filter. Another solution for the invalid sub region class is to use all the transformation filters corresponding neighboring valid subregion classes and either apply them successively or use a weighted output of the individual convolutions of the transformation filters with the raw input sub region.

Similarly, if a pixel belongs to more than one subregions (say, because of the non-overlapping image division process), there may be more than one candidate transformation filter. Only one of the transformation filters may be selected as described above, or all the candidate transformation filters may be successively convolved, and/or a weighted summation of the convolved outputs from the individual filters may represent the final outcome of the enhancement process.

Iterative Enhancement

The enhancement filters could also be applied to the fingerprint image iteratively (1710). In one embodiment, the original fingerprint image, say $I_0$, is enhanced to get the image $I_1$; $I_1$ is again enhanced to get $I_2$ (1720), and $I_2$ is further enhanced to get $I_3$. In general, we could apply the enhancement filters k>0 times to get a sequence of enhanced fingerprint images $I_1, I_2, \ldots, I_k$.

Method to Eliminate Orientation Partitioning

When the number of training images is small, some partitions may have very few samples. In such situations, orientation partitioning can be eliminated by a simple scheme. Let x be a pixel and O(x) be the orientation at pixel x. Let I be a m×n image window aligned along O(x) and centered at x. If w is the filter for pixel x, w is applied on this rotated window I.

Training Sample Selection Procedure

Here is a method to select the training image set automatically when a handful of training images from a large population of images has to be selected:

Let $A_1, A_2, \ldots, A_n$ be the attributes that we want to use for partitioning. For instance (frequency, orientation, amplitude) could be the three attributes used for partitioning. For each pixel or image block in the images we form an n-tuple $(a_1, a_2, \ldots, a_n)$ where $a_1$ is the value of the $i^{th}$ attribute for that pixel. Each such n-tuple is a point in an n-dimensional metric space. A clustering technique such as the k-means algorithm is used to discover clusters from these points. Each cluster represents a partition. The cluster centers are then used for determining the set of images to be used in training. The idea is to select images so that each partition class has an adequate number of pixels. Therefore, representative images for each partition class are selected. To determine the set of images to be included in the training set for the partition class j (i.e., cluster j determined previously), the following process is performed:

With each image $I_i$ in the population, do the following: for each pixel x in $I_1$ compute the values $a_1, a_2, \ldots, a_n$ of the partitioning attributes $A_1, A_2, \ldots, A_n$ at that pixel and form the n-tuple $(a_1, a_2, \ldots, a_n)$. Treating $(a_1, a_2, \ldots, a_n)$ as a point in the n-dimensional feature space, we determine the cluster in which this point falls and its distance from the cluster center. Suppose K>0 pixels of image $I_i$ fall in cluster j. Let $d_i^j$ be the average of the distances of these K pixels from the center of cluster j. A cost $C_i^j = d_i^j + S_j/K$ is assigned to image $I_i$, where $S_j$ is a non-zero constant. When K is small (i.e., only a few points of $I_i$ fall into cluster j) the term $S_j/K$ dominates and when K is large $d_i^j$ dominates $C_i^j$. At the end of this process, we have a set of non-zero values $C_1^j, \ldots C_N^j$. A small fixed sized set of images having the least costs is chosen to be included in the set of training images.

A preferred embodiment for determining $S_j$ uses $S_j$ to be the average of $d_i^1, \ldots, d_i^N$. To save some computation, the system considers only block centers in the above algorithm, instead of every pixel of the images.

Contrast Stretching of Fingerprint Images

One way to improve the visual quality of a fingerprint image is to stretch its contrast. However, the commonly used contrast stretching techniques do not give satisfactory visual results on fingerprint images. The contrast of fingerprint images can be improved significantly by a scheme that makes use of the local fingerprint characteristics. Such a scheme can also be used as a preprocessing step in enhancement.

Given below is preferred embodiments of enhancement and filter learning process. Now refer to FIG. 5. Given an input image to be enhanced and a set of the transformation enhancement filters (510), a method for dividing the input image into subregions (520) and a set of characteristics to be used for classification (partitioning) (530) of the sub regions is selected. Subregions (540) are determined based on the subregion division method (520). In step 550, the characteristics selected in step 530 are computed for each sub region determined in step 540. Based on the selected characteristics of the subregion (550), a transformation filter w is selected in step 560. The transformation filter w is applied to the subregion to obtained the enhanced subregions (570). When all enhanced subregions are determined (580), they are merged to obtained the entire enhanced image in step 590.

Referring to FIG. 6, in step 610, the learning enhancement step takes a set of example pairs of (poor quality, enhanced quality) images. This set is also referred to as training image/data set; the poor quality images constitute the input/raw image training set and the corresponding enhanced quality fingerprint set constitute enhanced image training set. The learning algorithm also selects a method for dividing the input image into subregions (620) and a set of characteristics to be used for classification (partitioning) (630) the sub regions is selected. Subregions (640) are determined based on the subregion division method (620). In step 650, the characteristics selected in step 630 are computed for each sub region determined in step 640. Based on the selected characteristics of the subregion (650), the sub region is held in a different partition/class. When all subregions are classified (670), the learning process continues the steps 640–670 on a different pair of (poor quality, enhanced quality) training image. When all subregions of training image pairs are classified (680), filter parameters for each partition are computed using all the subregions belonging to that class (690).

Figure 7:
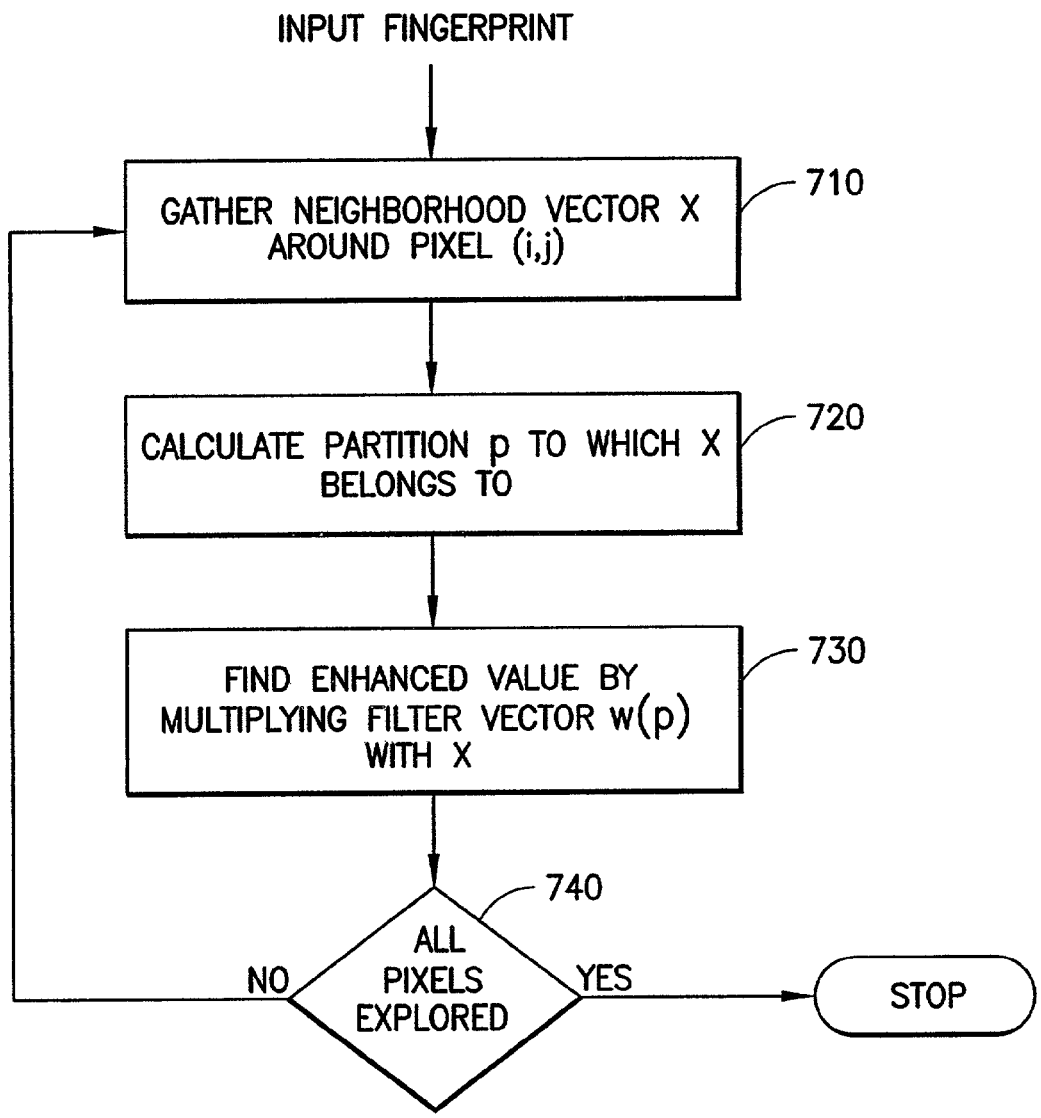
FIG. 7 gives the flowchart for computing the partition for each pixel of the input image and applying the corresponding filter on the pixel.
Figure 8:
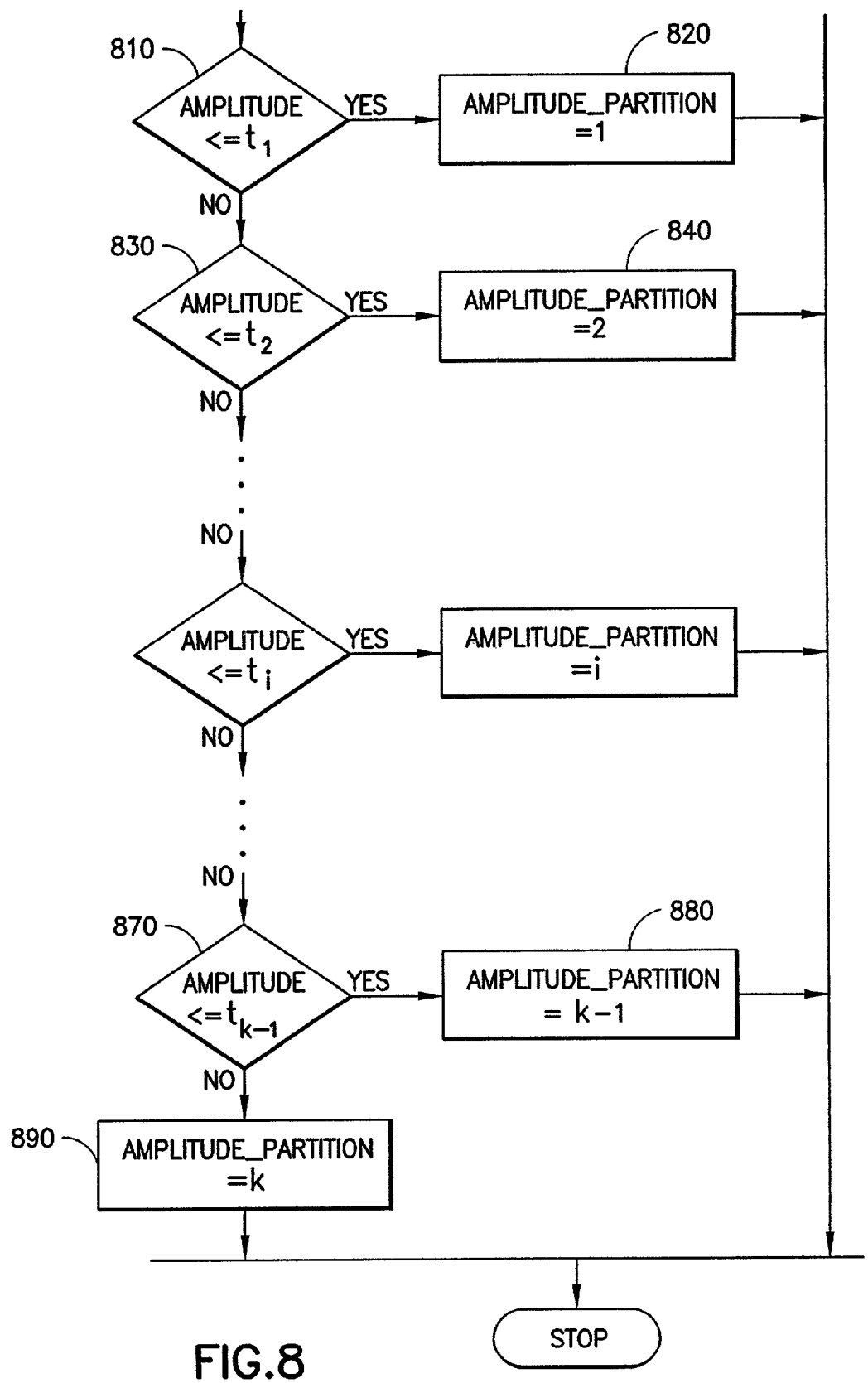
FIG. 8 gives the flowchart for computing the amplitude partition for a pixel.
Figure 9:
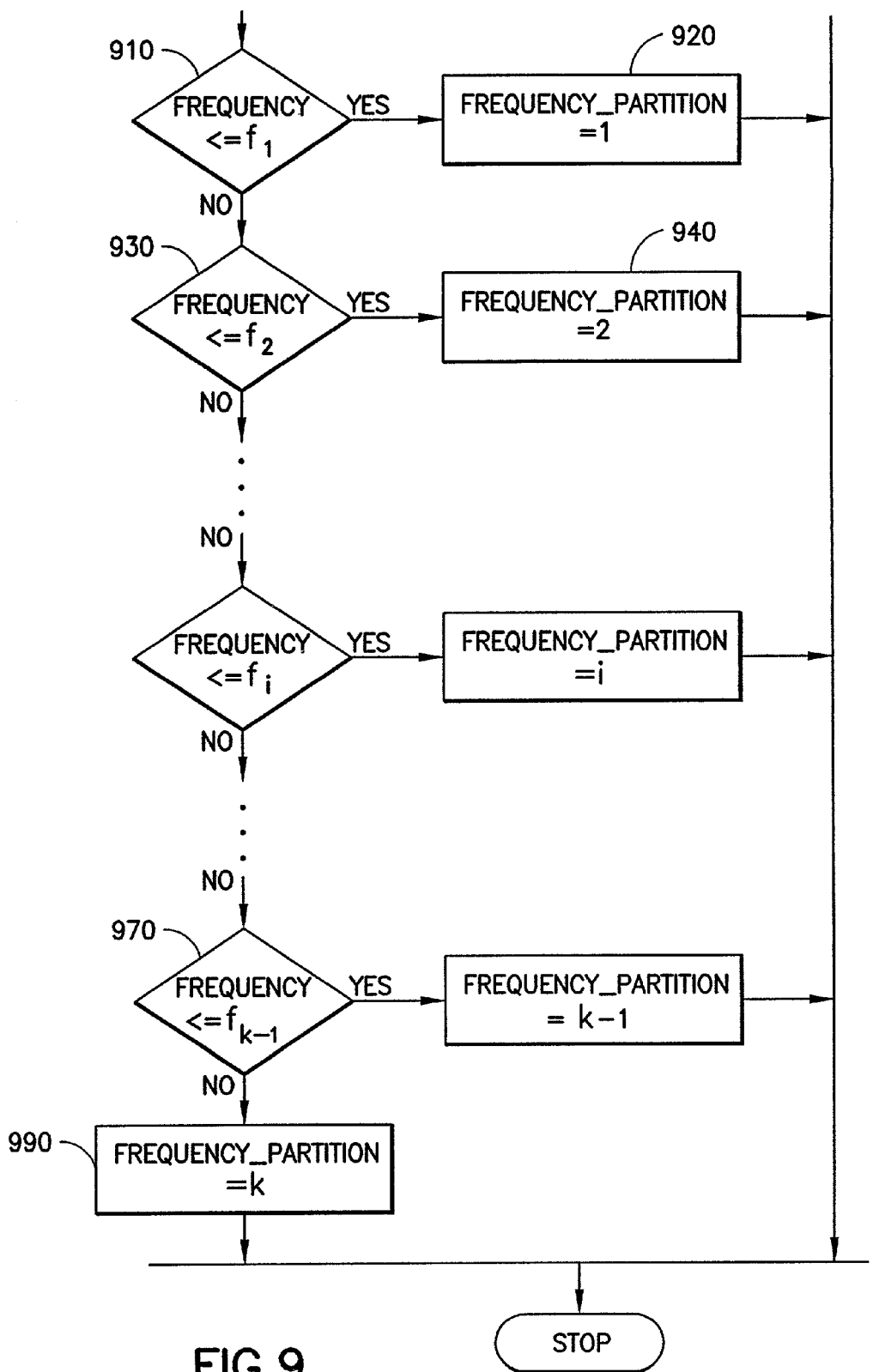
FIG. 9 gives the flowchart for computing the frequency partition for a pixel.
Figure 10:
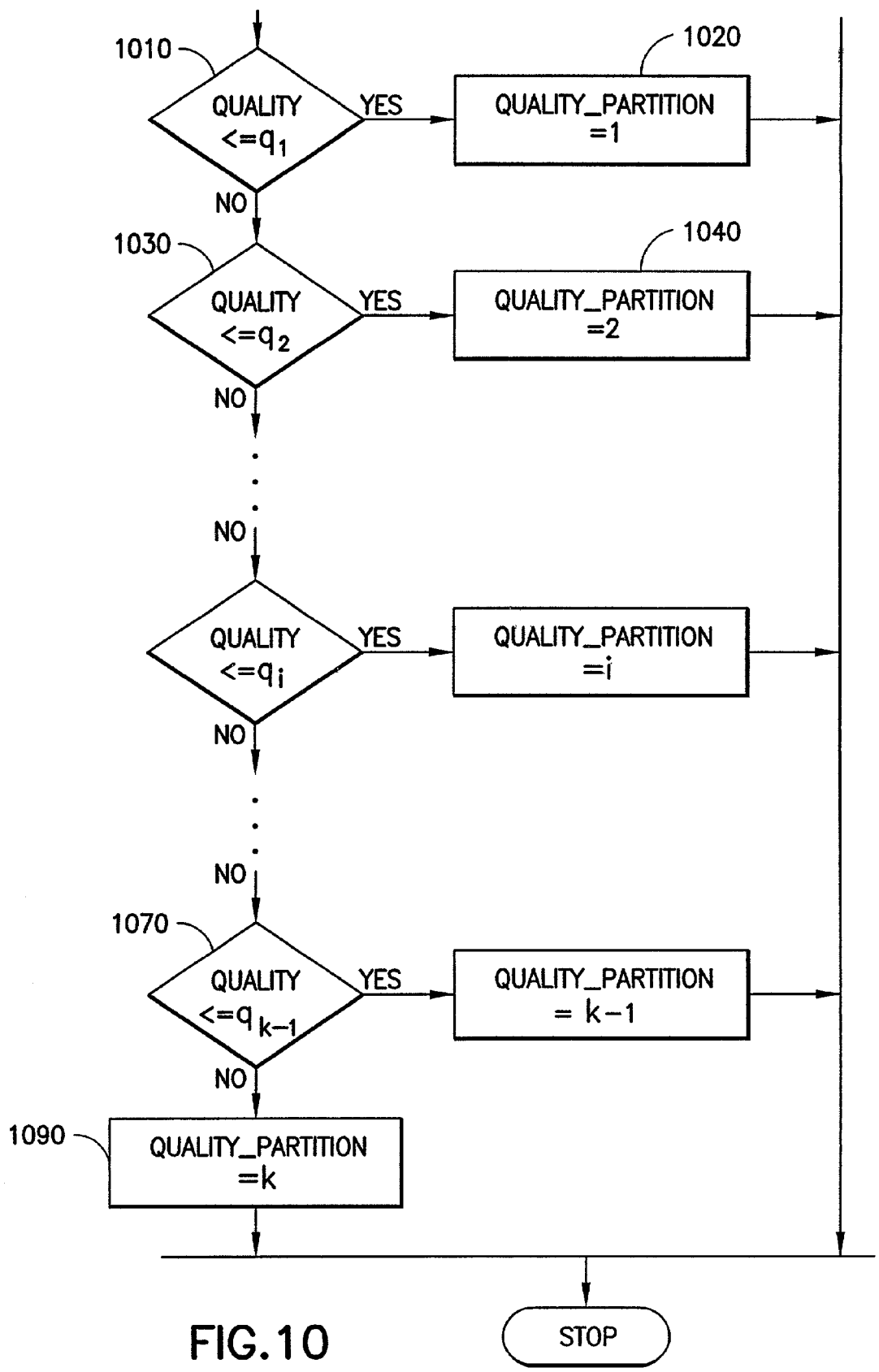
FIG. 10 gives the flowchart for computing the quality partition for a pixel.
Figure 11:
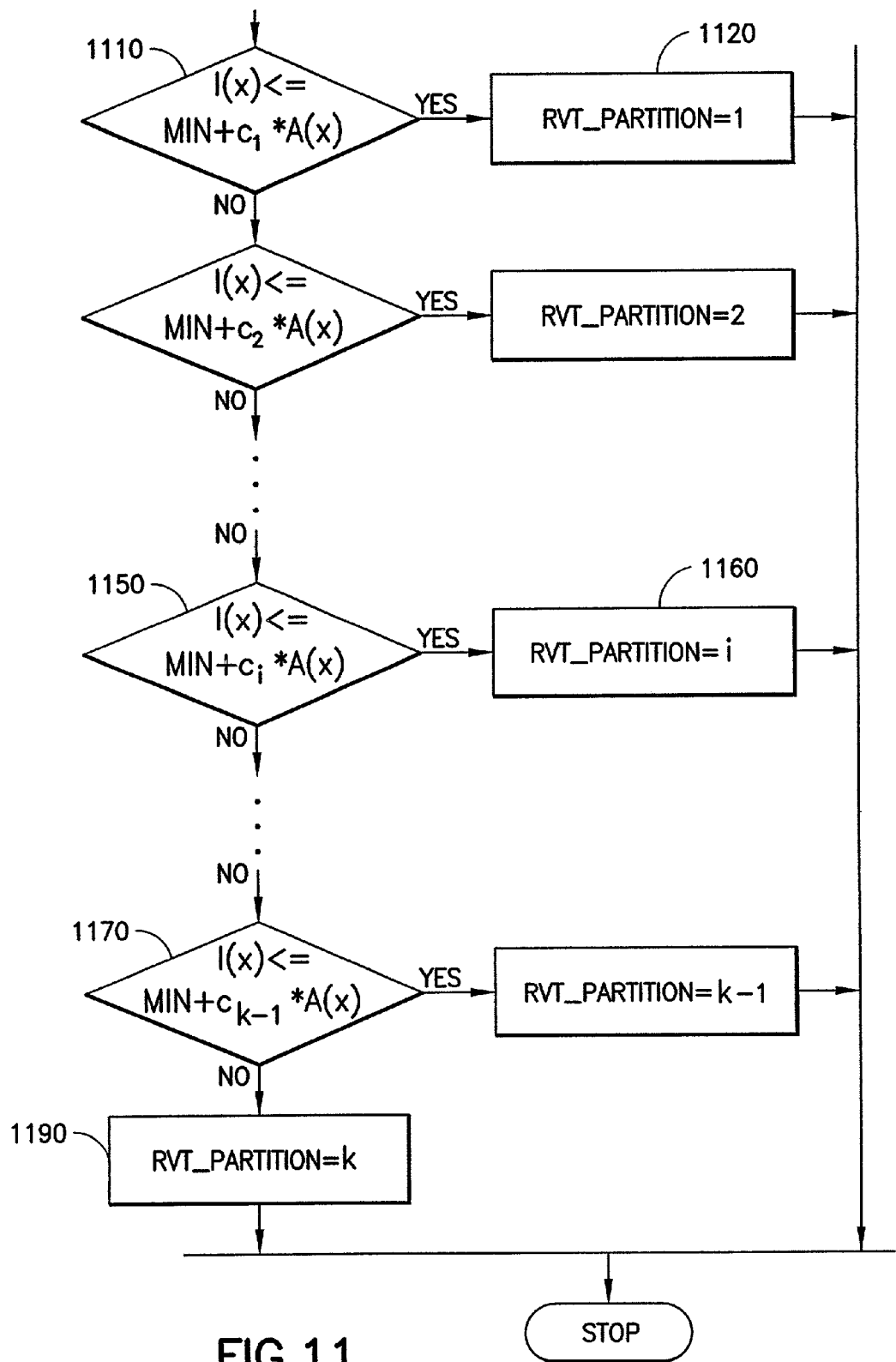
FIG. 11 gives the flowchart for computing the ridge/valley/transition partition for a pixel.
Figure 12:
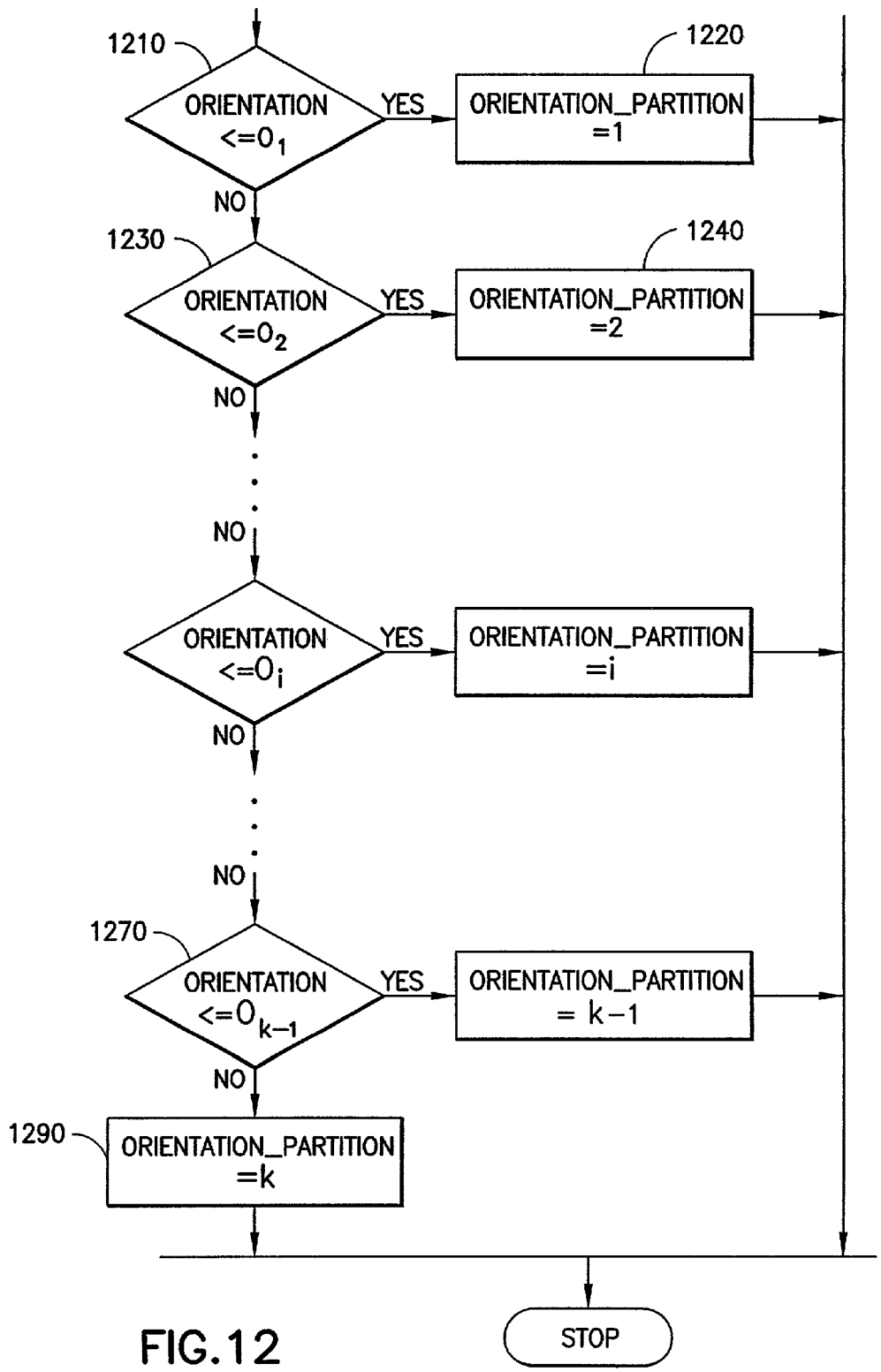
FIG. 12 gives the flowchart for computing the orientation partition for a pixel.
Figure 13:
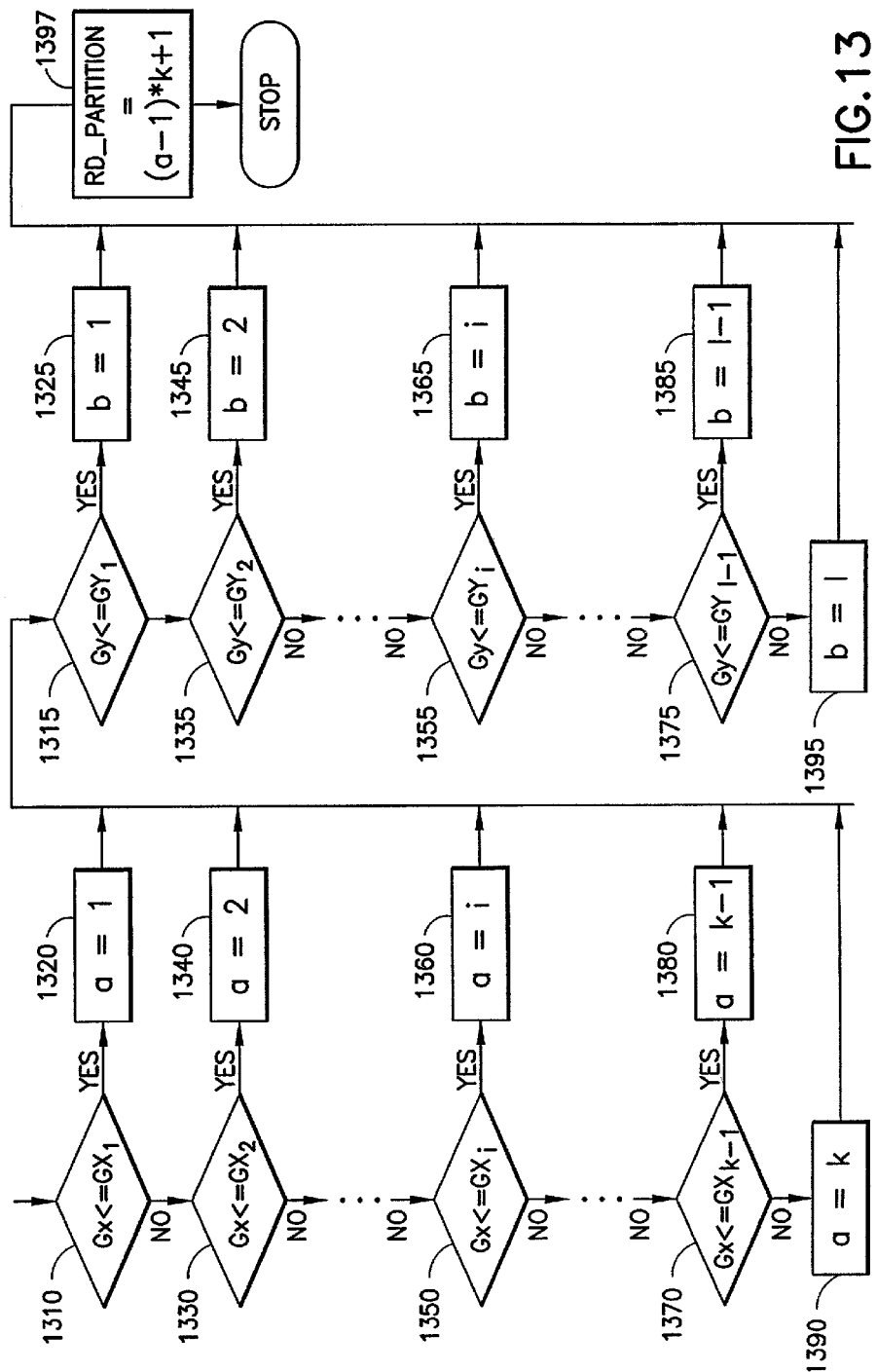
FIG. 13 gives the flowchart for computing the ridge/valley discontinuities partition computation.
Figure 14:
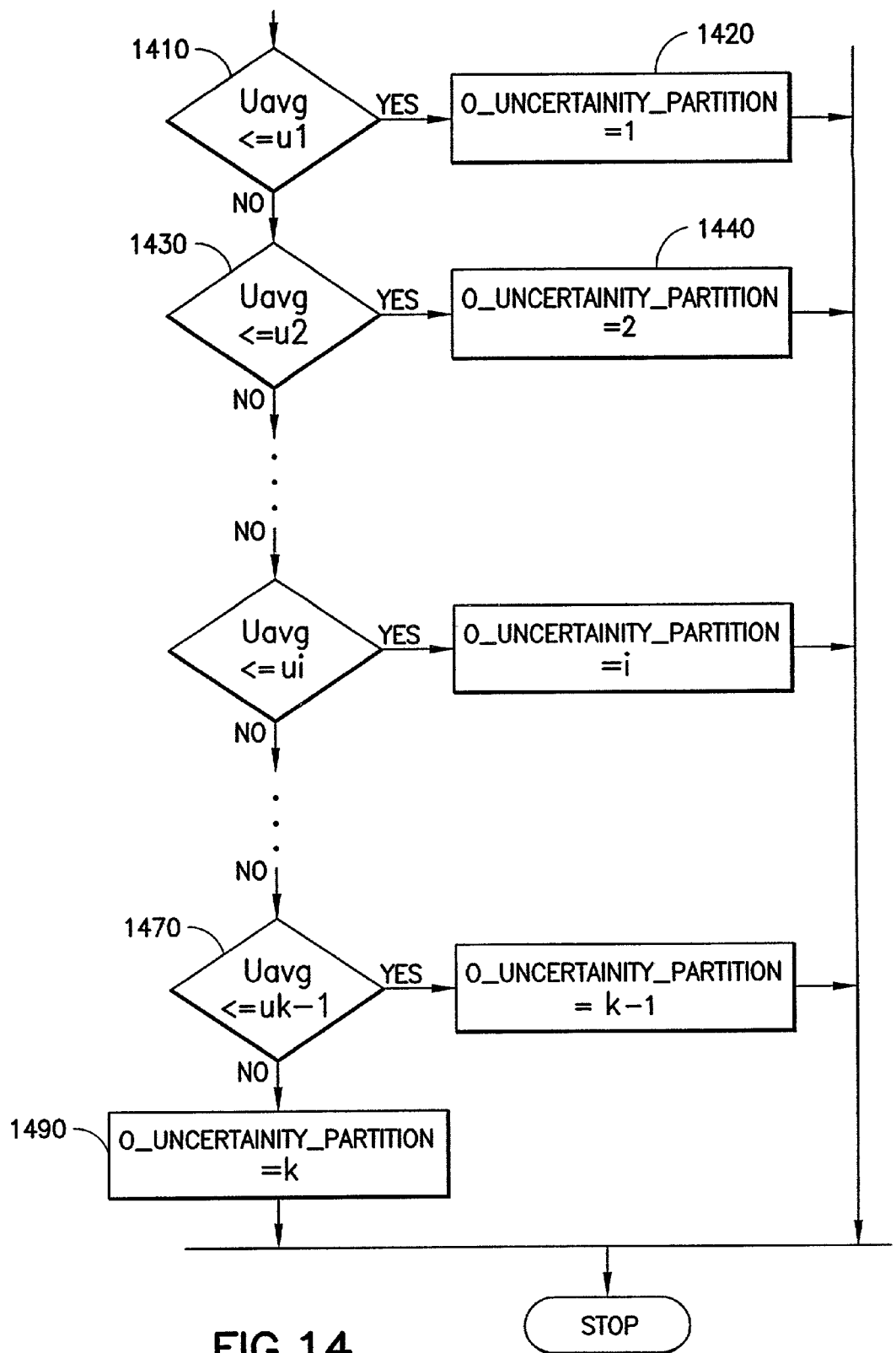
FIG. 14 gives the flowchart for computing the orientation uncertainity partition computation.

Refer to FIG. 7, it shows one preferred embodiment of enhancement method. Given an input image to be enhanced and a set of the transformation enhancement filters, a definition of pixel neighborhood (FIG. 3), a set of characteristics to be used for classification (partitioning) of pixels are selected. For each pixel in the image, its neighborhood pixels are collected (710), and based on the neighborhood pixels, the corresponding partition p is determined (720). Based on the partition of the pixel (720), a transformation filter w(p) is selected and applied to the pixel to obtain the enhanced value corresponding to that pixel 730. When all enhanced values of all the pixels are determined (740), the enhancement method is finished.

Figure 15:
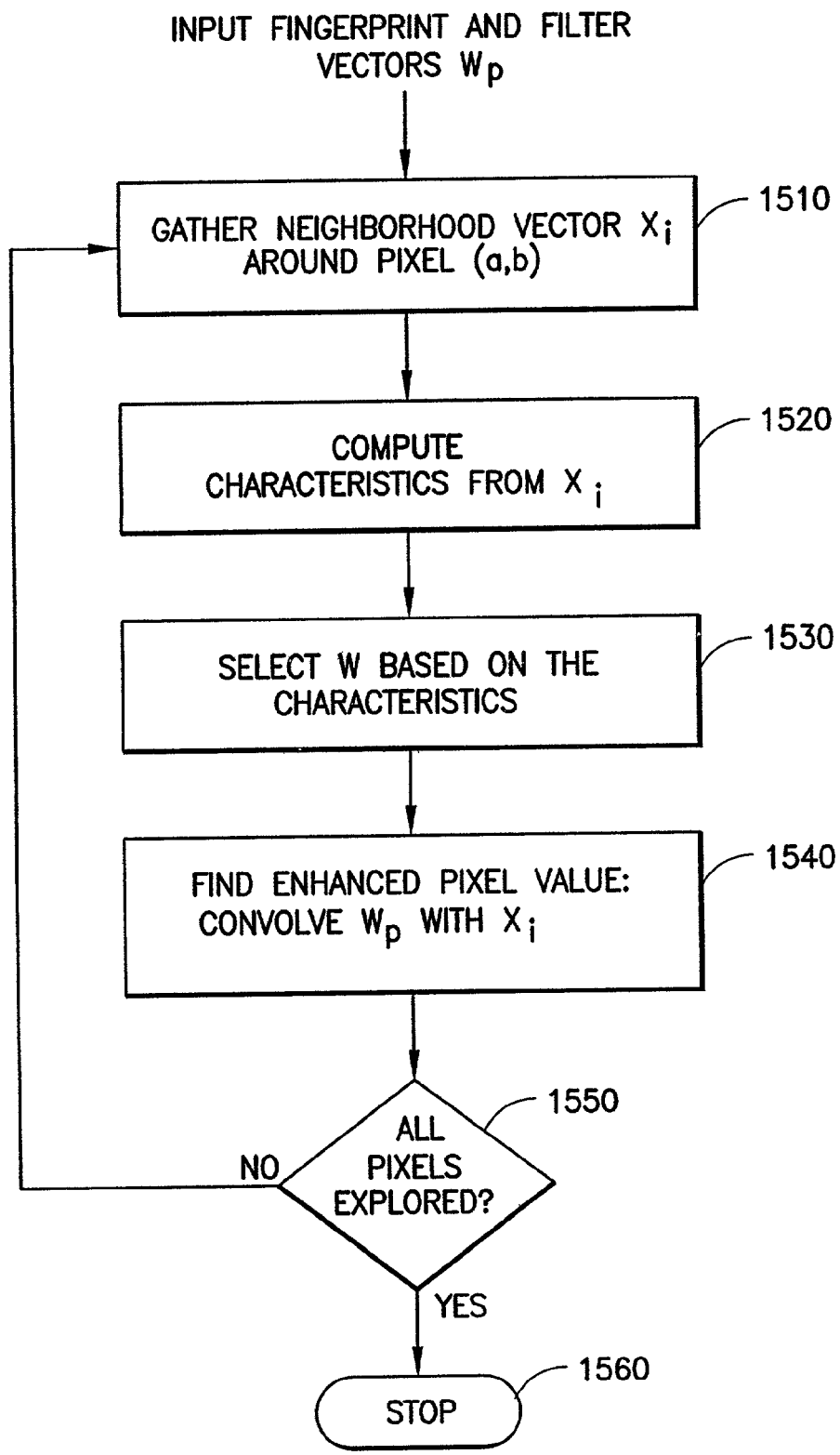
FIG. 15 gives the flowchart for input image enhancement.

Refer to FIG. 15, it shows one preferred embodiment of enhancement method. Given an input image to be enhanced and a set of the transformation enhancement filters, a definition of pixel neighborhood (FIG. 3), a set of characteristics to be used for classification (partitioning) of pixels are selected. For each pixel in the image, its neighborhood pixels are collected (1510), and characteristics of the neighborhood pixels is determined (1520), a transformation filter w(p) is selected (1530) and applied to the pixel to obtain the enhanced pixel value corresponding to that pixel 1540. When all enhanced values of all the pixels are determined (1540), the enhancement method is finished.

Figure 16:
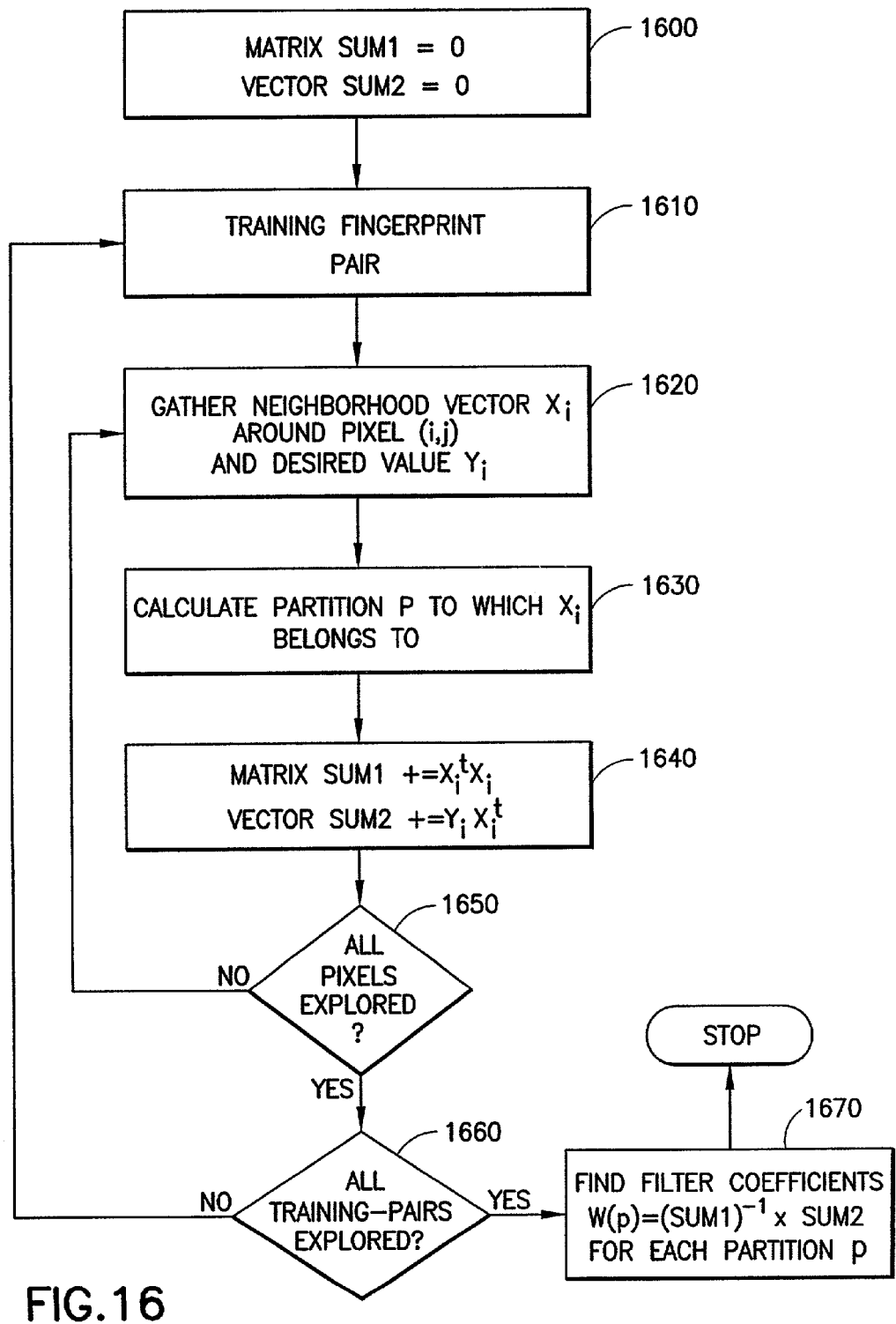
FIG. 16 gives the flow chart for filter learning process.
Figure 17:
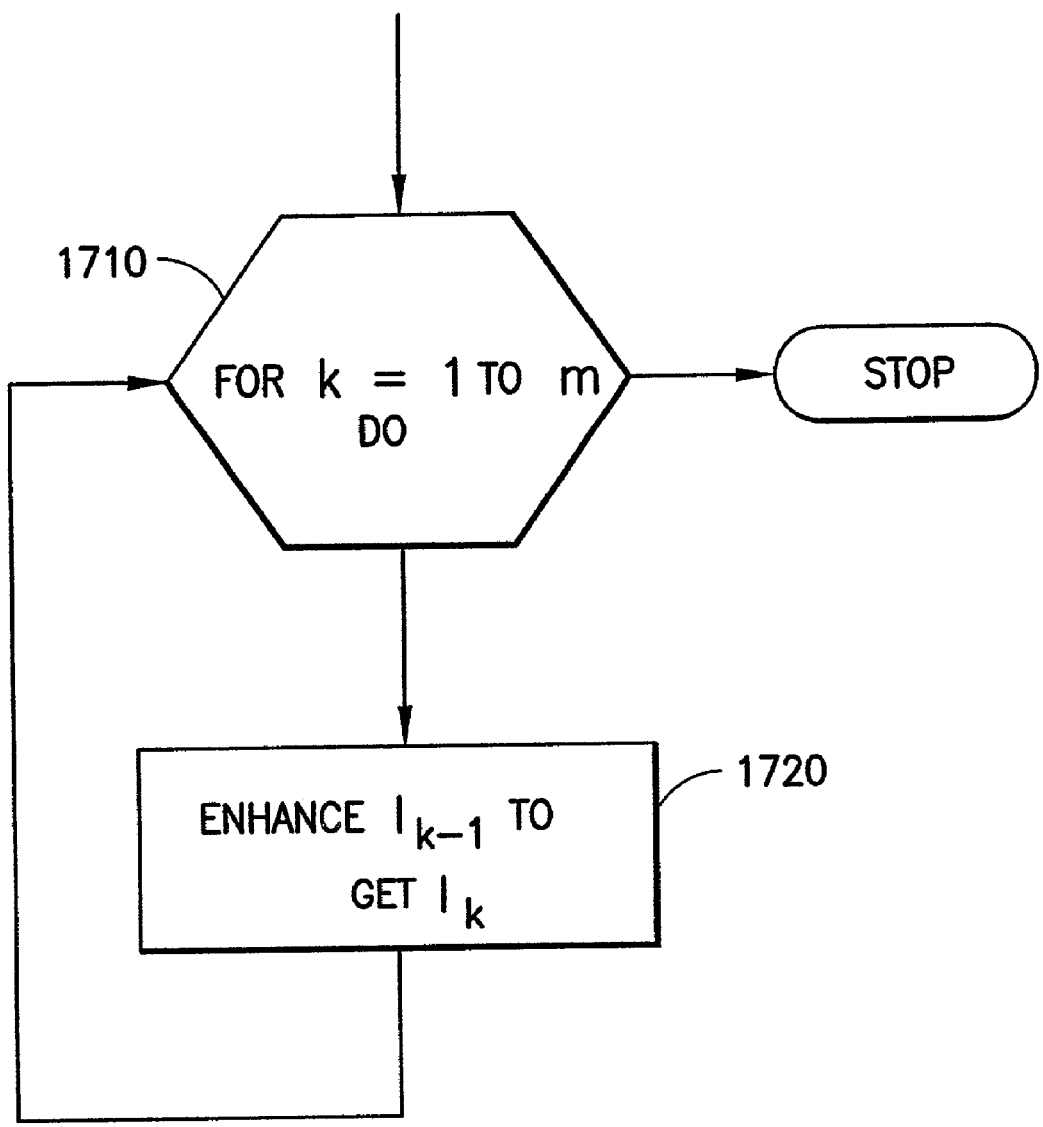
FIG. 17 gives the flowchart for iterative enhancement of the input fingerprint image.

Refer to FIG. 16, it shows one preferred embodiment of enhancement learning process. For each partition p, it starts with initializing a matrix sum1(p) and vector sum2(p) to zero (1600). It then takes a (poor quality, enhanced quality) of training images (1610). Neighborhood pixels (FIG. 3) for each pixel (i, j) in the poor quality image is selected and also the desired enhanced value of the corresponding pixel from the enhanced quality image is selected (1620). In step 1630, partition p is determined based on the characteristics of neighborhood pixels of pixel (i, j). Then, sum1(p) and sum2(p) are updated as shown in step 1640 based on the neighborhood pixel values of pixel (i, j) belonging to partition p. When all pixels are visited for a training image pair (1650), the learning process continues the steps 1610–1650 on a different pair of (poor quality, enhanced quality) training image. When all pixels of training image pairs are thus visited; sum1, sum2 are updated corresponding to the partitions of the pixels (1660), filter parameters w(p) for each partition p are computed using sum1(p) and sum2(p) corresponding to that partition as shown in step 1670.

We claim:

1. A fingerprint image enhancement process comprising:
   establishing plural sub region filters using a learning process, the learning process including obtaining a representative set of fingerprints and establishing, using a human or machine expert, a corresponding set of desired maps, a set of filters being developed therefrom;
   partitioning the image into sub regions, each sub region representing a portion of a fingerprint image;
   for at least some sub regions, determining a value for each of one or more fingerprint image characteristics of the sub regions;
   using the values, classifying at least some sub regions into one or more classes;
   selecting one or more respective filters for each respective class; and
   for each sub region having a class, convolving the respective portion of the fingerprint image with the respective filter or filters to obtain a transformed sub region.

2. The process, as in claim 1, where two or more transformed sub regions are combined to produce an enhanced sub region.

3. The process, as in claim 2, where the transformed sub regions are combined using a weighted summation of the transformed sub regions.

4. The process, as in claim 1, where one or more of the sub regions are determined by any one or more of the following: a pixel-wise amplitude of the sub region, an average amplitude of the sub region, an image frequency of the subregion, an orientation of the sub region, an amplitude transition in the orientation direction, a local contrast, a local phase, a scalar quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image.

5. The process, as in claim 1, where a number of the sub regions is determined by any one or more of the following: a pixel-wise amplitude of the sub region, an average amplitude of the sub region, an image frequency of the subregion, an orientation of the sub region, an amplitude transition in the orientation direction, a local contrast, a local phase, a scalar quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image.

6. The process, as in claim 1, where a shape of the sub regions are determined by one or more of the following: a pixel-wise amplitude of the sub region, an average amplitude of the sub region, an image frequency of the subregion, an orientation of the sub region, an amplitude transition in orientation direction, a local contrast, a local phase, a scalar quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image.

7. The process, as in claim 1, where an extent of overlap one or more of the sub regions is determined by any one or more of the following: a pixel-wise amplitude of the sub region, an average amplitude of the sub region, an image frequency of the subregion, an orientation of the sub region, an amplitude transition in the orientation direction, a local contrast, a local phase, a scalar quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image.

8. The process, as in claim 1, where the characteristics include any one or more of the following: a pixel-wise amplitude of the sub region, an average amplitude of the sub region, an image frequency of the subregion, an orientation of the sub region, an amplitude transition in the orientation direction, a local contrast, a local phase, a scaler quantization of intensity values of the sub region, a vector quantization of intensity values of the sub region, a dryness measure of the sub region, a smudge measure of the sub region, a quality of the sub region, an average amplitude of the entire image, an average frequency of the entire image, an average quality of the entire image, and an average orientation variation of the entire image.

9. The process, as in claim 1, where the transform filter is chosen from a class that is near to the selected class.

10. The process, as in claim 9, where near is defined by any one or more of the following: a least square distance, an absolute distance, and an ordinal distance.

11. The process, as in claim 1, where the characteristic is amplitude and the value is an amplitude intensity value.

12. The process, as in claim 1, where the characteristic is the ridge orientation in a neighboring subregion and the value is orientation of the ridge with respect to x-axis in t-multiples of degrees.

13. The process, as in claim 12, where t=90.

14. The process, as in claim 1, where the characteristic is image frequency and the value is a cycle per distance value.

15. The process, as in claim 1, where the characteristic is a quality and the value based on an image type.

16. The process, as in claim 1, where the characteristic is a texture and the value is based on a pattern repetition value.

17. The process, as in claim 1, where the characteristic is an amplitude transition.

18. The process, as in claim 1, where the characteristic is a perpendicular amplitude transition.

19. The process, as in claim 1, where the characteristic is an orientation variation and the value is the standard deviation of orientations in the neighborhood.

20. The process, as in claim 1, where one or more of the transformed filters is applied more than once to obtain the transformed sub region.

21. The process, as in claim 20, where the number of times the transform filter is applied is predetermined.

22. The process, as in claim 1, where the set of filters is developed using a least squares fit.

23. A method of fingerprint image enhancement, comprising:

learning a set of partitioned least-squares filters derived from a given set of fingerprint images and expert-developed ground truth pairs; and for each of at least some sub regions of a fingerprint image, convolving at least one respective filter with an input fingerprint image of the sub region to obtain an enhanced image.

24. The method of claim 23, wherein a filter is defined by $w=(X^TX)^{-1}X^TY$, wherein k represents a sub region, $x_i$ is a vector given by $[x_1^i, x_2^i, \ldots x_j^i, x_k^i]$, where $x_j^i$ is the image intensity at the j-th location within the i-th sub region; and further wherein $Y_i$ is enhanced intensity at pixel i, provided by a fingerprint expert, and wherein X is a matrix defined by $[x_1, x_2 \ldots x_i, x_M]^T$, Y is a matrix defined by $[y_1, y_2 \ldots y_i, y_M]^T$, where M is the number of candidate pixels from a class of the sub region and T is a transpose of a matrix or vector.

* * * * *